US008938255B2

(12) United States Patent
Tsruya et al.

(10) Patent No.: US 8,938,255 B2
(45) Date of Patent: Jan. 20, 2015

(54) DEVICES, METHODS, AND SYSTEMS FOR RADIO MAP GENERATION

(75) Inventors: Shalom Tsruya, Rishon Letzion (IL); Rafi Dalla Torre, Givataim (IL); Daniel Aljadeff, Kiriat Ono (IL); Amir Lavi, Rehovot (IL)

(73) Assignee: Aeroscout, Ltd (IL)

( * ) Notice: Subject to any disclaimer, the term of this patent is extended or adjusted under 35 U.S.C. 154(b) by 534 days.

(21) Appl. No.: 13/195,206

(22) Filed: Aug. 1, 2011

(65) Prior Publication Data

US 2013/0035109 A1 Feb. 7, 2013

(51) Int. Cl.
*H04M 11/04* (2006.01)
*H04W 24/00* (2009.01)
*G01S 5/02* (2010.01)
*H04W 64/00* (2009.01)

(52) U.S. Cl.
CPC .............. *G01S 5/0252* (2013.01); *H04W 64/00* (2013.01)
USPC .................................... 455/456.1; 455/404.2

(58) Field of Classification Search
CPC ... H04W 64/00; H04W 4/02; H04L 29/08657
USPC .......................................... 455/456.1, 404.2
See application file for complete search history.

(56) References Cited

U.S. PATENT DOCUMENTS

| | | | | |
|---|---|---|---|---|
| 2005/0208952 | A1* | 9/2005 | Dietrich et al. | 455/456.1 |
| 2005/0246334 | A1* | 11/2005 | Tao et al. | 707/5 |
| 2007/0060098 | A1* | 3/2007 | McCoy | 455/404.2 |
| 2011/0059752 | A1* | 3/2011 | Garin et al. | 455/456.1 |

OTHER PUBLICATIONS

International Search Report in related PCT Application No. PCT/IL2012/050198 (9 pages).

* cited by examiner

*Primary Examiner* — William D Cummings
(74) *Attorney, Agent, or Firm* — Finnegan, Henderson, Farabow, Garrett & Dunner, LLP.

(57) ABSTRACT

Systems, devices, methods, and computer-readable mediums for generating a radio map of an area are disclosed. In one aspect, the device, method, and computer-readable medium perform processes that may include receiving in at least one processor first information associated with at least one wireless device at a first location in the area. The processes may include receiving in the at least one processor second information associated with at least one wireless device at a second location in the area and different from the first location. The first location within said area and the second location within the area are unknown to the at least one processor. The processes may also include generating a radio map of the area using the first information and the second information.

75 Claims, 9 Drawing Sheets

| Zone \ Receiver ID | Receiver 1 ID | Receiver 2 ID | Receiver 3 ID | ... | Receiver N ID |
|---|---|---|---|---|---|
| X1,Y1 | RSSI [dBm] | RSSI [dBm] | RSSI [dBm] | | RSSI [dBm] |
| X1,Y2 | RSSI [dBm] | RSSI [dBm] | RSSI [dBm] | | RSSI [dBm] |
| . . . | | | | | |
| Xn,Ym | RSSI [dBm] | RSSI [dBm] | RSSI [dBm] | | RSSI [dBm] |

Fig. 6

| Zone \ Receiver ID | Receiver 1 ID | Receiver 2 ID | ... | Receiver N ID |
|---|---|---|---|---|
| $X_1,Y_1,Z_1$; $X_2,Y_2,Z_2$; $X_3,Y_3,Z_3$; $X_4,Y_4,Z_4$; $X_5,Y_5,Z_5$ | Wireless Signals Propagation Characteristics | Wireless Signals Propagation Characteristics | | Wireless Signals Propagation Characteristics |
| $X_6,Y_6,Z_6,D_6$ | Wireless Signals Propagation Characteristics | Wireless Signals Propagation Characteristics | | Wireless Signals Propagation Characteristics |
| . . . | | | | |
| $X_{n-2},Y_{m-2},Z_{R-2}$; $X_{n-1},Y_{m-1},Z_{R-1}$; $X_n,Y_m,Z_R$ | Wireless Signals Propagation Characteristics | Wireless Signals Propagation Characteristics | | Wireless Signals Propagation Characteristics |

Fig. 7

DEVICES, METHODS, AND SYSTEMS FOR RADIO MAP GENERATION

TECHNICAL FIELD

Aspects of the present invention relate to the generation of radio maps which may be used for various purposes in wireless communication systems and wireless location systems. More specifically aspects of embodiments of the invention relate to the generation of a radio map of an area based on measurements associated with mobile wireless devices operating in that area.

TECHNICAL BACKGROUND

A multitude of wireless communications systems are in common use today. Mobile telephones, pagers and wirelessly-connected computing devices such as personal digital assistants (PDAs) and laptop computers provide portable communications at virtually any locality. Wireless local area networks (WLANs) and wireless personal area networks (WPANs) according to the Institute of Electrical and Electronic Engineers (IEEE) specifications 802.11 (WLAN) (including 802.11a, 802.11b, 802.11g, 802.11n, etc.), 802.15.1 (WPAN) and 802.15.4 (WPAN-LR) also provide wireless interconnection of computing devices and personal communications devices, as do other devices such as home automation devices.

Within the above-listed networks and wireless networks in general, in many personal, commercial and industrial applications it may be desirable to map and monitor the wireless coverage of network devices in an area.

In addition, in many of those networks also including location capabilities it may be desirable to monitor mobile wireless devices and RFID tags and estimate their location.

Having a reliable representation of the actual wireless signals propagation behavior in a communication system may be valuable for enabling optimal performance. This may be needed for site planning, cell partition and channel assignment, mobile device roaming, transmission power tuning, etc. In many systems, a wireless coverage mapping is performed during the initial design process and thereafter, systems do not dynamically react to environmental changes, equipment failures or changes, deployment changes, or any other change that might influence wireless coverage.

In other wireless communication systems, the received signal strength of signals transmitted and received by network devices (e.g. WLAN Access Points) in the same area, is measured. While this technique may provide a more dynamic picture of the wireless signals propagation behavior, it may still be limited to the quality of reception related to the network devices themselves. This technique may not provide sufficiently accurate information regarding the wireless signals propagation behavior of wireless mobile units in that area.

Some wireless communication systems include the use of Wi-Fi RFID tags, which have significantly increased in recent years. Wireless tags may be used, for example, for tracking assets, in many industries such as, for example, healthcare, manufacturing, logistics, retail, oil and gas.

Although there are many methods may be used to locate mobile wireless devices, using Received Signal Strength Indicator (RSSI) measurements became very popular for the following reasons:

Performing measurements may be performed with relative technical simplicity. Many commercial IEEE802.11x Access Points or other radios have the ability to measure the RSSI of received signals.

Relatively good location accuracy may be achieved in a variety of indoor and outdoor environments. This accuracy can be around few meters (1-3 meters).

Location system simplicity. RSSI-based location systems may be simpler to deploy (e.g. many do not require special synchronization techniques or special hardware).

Most wireless mobile devices can be located.

In many wireless networks, signal strength measurements along with other information are used to estimate the expected wireless coverage (typically referred as radio map) of the network devices (e.g. Access Points, base stations, etc.) in an area. In wireless location systems, that radio map may also be used to estimate the location of wireless mobile devices.

In other cases, the mobile wireless device itself measures the received signal strength of signals transmitted by network devices and transfers those measurements to a network server. Those signal strength measurements may be used both to generate the radio map and to estimate the location of that mobile device. Moreover, once a radio map of an area was generated and transferred to a mobile device operating in that area, this device may have the ability to calculate its own location without involving a network server in this process.

There are many algorithms based on received signal strength (RSSI) which are used to estimate the location of a wireless device. Pioneering research proposed a technique called RF fingerprinting that uses empirically measured signal strengths to estimate a wireless mobile unit location. The location software calculates the location of the mobile device using the received signal strength measurements, sometimes together with additional RF signals propagation characteristics such as reflection indexes, attenuation levels, signal strength variance of wireless signals related to wireless devices at known points, data which is further used to map the wireless signal propagation behavior in an area.

The RF fingerprinting data is arranged in what is typically denominated as "radio maps". Generally speaking, radio maps provide the wireless signals propagation characteristics related to zones in an area. Typically those zones are square zones represented by a single point in a grid but in more generic embodiments, zones may be represented by any type of polygon.

In one implementation of the above described radio maps, the wireless signals propagation characteristics comprise the expected signal strength of received signals at certain zones (represented by points) in an area, either when the wireless signals are transmitted by mobile devices (at the corresponding points) and received by network devices or vice versa (the signals are transmitted by the network devices and received by the mobile devices at those zones in the area).

In other implementations of the radio maps, the wireless signals propagation characteristics may include additional information, including the expected variance of the signal strength measurements, the probability to receive signals at a specific point, etc.

Other types of radio maps are those where the wireless signals propagation characteristics comprise the propagation channel parameters at points or zones in the area, instead of the expected signal strength as previously described. Keeping the propagation channel parameters instead of expected signal strength values may provide the possibility to generate a more compact radio map since the same channel parameters may be used for large zones in an area and sometimes for a group of receivers or transceivers. In this case, the expected signal strength at a specific point in the area can be derived from the propagation channel parameters at that point.

Typically, the radio map generation technique works in two phases. In the so-called calibration phase (before the wireless system becomes operational), signal strengths (and if needed, also other parameters) are collected at multiple locations throughout the defined area (typically, but not necessarily an indoor area). The received signal strength measurements and optionally any additional information (e.g. message reception probability, variance of signal strength, etc.) may be stored together with the physical (e.g. x; y; z coordinates) locations at which they are measured. In an exemplary system, each (location; signal strength) entry is called a finger print and is stored in a database called a radio map. In another configuration, each entry of the radio map comprises of a single or plurality of points (e.g. a zone) with the corresponding channel parameters.

As previously mentioned, the radio maps may subsequently be used for various purposes according to the desired functionality of the wireless system. In a location system, the radio maps may be used by the location algorithms to estimate the location of wireless devices by correlating actual RSSI measurements to the data in the radio map.

Current methods of generating radio maps (either when used for wireless networks applications or for location), may require a calibration process (as explained before) of the area related to the radio map.

Typically the calibration process is a manual process and comprises collecting RSSI values and other parameters at a plurality of known zones or points in an area and this may be a lengthy process, particularly when large areas need to be calibrated.

Moreover, in addition to the long time that may be needed to initially calibrate an area, the relevance of the collected data tends to degrade over time. This is caused by changes in the environment (e.g. structural changes) or in the network (e.g. location of Access Points or other transceivers). Those changes may cause a degradation of the radio map relevance and consequently also a degradation of the location accuracy when this is applicable to location systems. In some cases, significant changes may require a new calibration process.

In addition, dynamic environmental changes like variation in the number of people present in an area, different humidity levels or different orientation of the mobile devices may result in a situation in which received signal strengths collected at one time may not accurately reflect the received signal strengths seen in the same locations at other times.

In other cases, the calibration process itself may require performing measurements in areas which have restricted access (e.g. patient rooms in hospitals, underground mines or hazardous areas).

It is desirable to provide improved methods, systems and devices for the generation of radio maps, regardless of the environment in which the radio map is to be used or the technical details of a network or system in which the radio map is to be employed (e.g., whether related to a pure wireless communication system or to a wireless communication and location system.)

Accordingly, in one embodiment of the disclosed embodiments, a method is provided to generate a radio map of an area, based on wireless signal measurements related to wireless mobile devices operating in that area, without necessarily using location information of the mobile units involved in the generation of the radio map in that area.

In another embodiment, a method is provided to generate a radio map of an area further comprising a continuous update of the radio map based on new measurements, thus providing improved performance in case of environmental and network changes.

The foregoing description is merely exemplary for providing general background and is not restrictive of the various embodiments of systems, methods, devices, and features as described and claimed.

SUMMARY OF A FEW ASPECTS OF THE DISCLOSED EMBODIMENTS

According to one aspect of the invention, a computer-readable medium is disclosed that includes instructions for controlling at least one processor to perform a method of generating a radio map of an area. The method may comprise receiving in the at least one processor first information associated with at least one wireless device at a first location in the area, where the first location within said area is unknown to the at least one processor. The method may also include receiving in the at least one processor second information associated with at least one wireless device at a second location in the area and different from the first location, where the second location within said area is unknown to the at least one processor. In addition, the method may include generating the radio map of the area using the first information and the second information.

In another embodiment of the present invention, the computer readable medium may include instructions for controlling at least one processor to perform a method that includes receiving in the at least one processor third information associated with at least one wireless device different from the at least one wireless device associated with the first and second information. The method may further include using the third information to modify at least one estimated location of the at least one wireless device associated with the first and second information.

In certain embodiments, the generated radio map may be applicable to a wireless communication system that is also a location system having the ability to locate wireless devices. The location system may use the generated radio map to estimate the position of mobile wireless devices in the area.

The foregoing summarizes just a few aspects of the disclosed embodiments and is not intended to be restrictive of the inventions described, illustrated, and claimed hereafter.

BRIEF DESCRIPTION OF THE DRAWINGS

FIG. 6 depicts a simple format of an exemplary radio map in accordance with one embodiment of the present invention.

FIG. 7 depicts an exemplary generic format of a radio map in accordance with another embodiment of the present invention.

In the Figures and Description of Exemplary Preferred Embodiments that follow, common reference numerals are used throughout to indicate like elements.

DETAILED DESCRIPTION OF EXEMPLARY PREFERRED EMBODIMENTS

Figure 1:
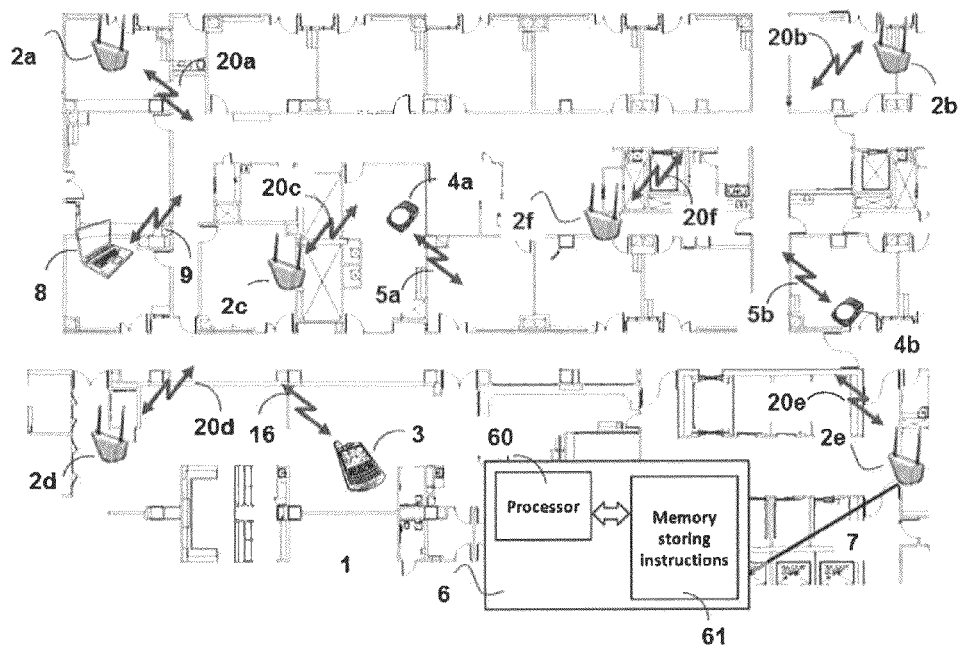
FIG. 1 depicts a wireless communication system in which an exemplary embodiment according to the present invention may be implemented.

The detailed description of exemplary embodiments of the computer-readable mediums, devices, systems, features and methods for radio map generation is described below.

Embodiments of the present invention relate to the generation of radio maps which may be used for many purposes in wireless communication systems and wireless location systems. More specifically they may relate to the generation of a radio map of an area based on signal measurements associated to mobile wireless devices in that area.

Unless otherwise defined, all technical and/or scientific terms used herein have the same meaning as commonly understood by one of ordinary skill in the art to which the embodiments of the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Some embodiments of the invention are herein described, by way of example only, with reference to the associated drawings. With specific reference now to the drawings in detail, it is stressed that the details shown are by way of example and for purposes of illustrative discussion of embodiments of the invention. In this regard, the description taken with the drawings provide examples sufficient to make apparent to those of ordinary skill in the art how to implement inventive concepts of the invention.

Embodiments of the invention may involve radio maps. As used herein, the term "radio map" may include a collection of data elements (typically stored as a computer-readable medium) including the mathematical representation of wireless signal propagation characteristics and/or propagation channel parameters related to a certain area. An area may be divided into a plurality of zones, and consequently a radio map may include wireless signal propagation characteristics and/or propagation channel parameters related to at least one zone of said plurality of zones.

The collection of data elements (frequently organized as a data set) may be organized in any format and may include one or more tables, a data base, one or more lists, strings of parameters or numerical values, XML, or any combination between them. The elements of the data set may include numbers, mathematical formulae, text (e.g. text describing the area, radio map characteristics, radio map generation related data, thresholds, date and time, keys, radio map data structure, search methods, quality factors, etc.), geographical information (e.g. coordinates, offsets, etc.), pointers to elements, indexes, mathematical representation of geometric shapes, ID's (identification code), statistical data, addresses, or any combination between them.

The radio map may include compressed and uncompressed data, binary strings or numbers, ASCII characters, ISO codes, or any other type of data encoding.

A radio map for an area can be generated only once or several times over a period of time. A radio map can be modified in part or in its entirety.

The term "area" refers to any space, bounded or unbounded, in which mobile wireless devices can operate. This space can be indoors or outdoors, on the ground, underground, or above ground, or any combination thereof, and can include for example a room, a group of rooms, a building, a portion of a building (e.g. a floor, a portion of a floor, or group of floors or portions of floors), elevated spaces, a yard, parking lot or garage, warehouse, business, residence, office, mall, plaza, casino, sports facility, food service facility, depot, hospital or other medical facility, storage facility, repair facility, manufacturing facility, transportation hub, distribution hub, campus, living facility, city, town, village or neighborhood or any portion thereof; public or private space, mines, tunnels, any space on any suitable vehicle, including ships or other watercraft, wheeled transport vehicles, aircraft or any other vessels; and any and all combinations of the above, portions of the above, or combinations of portions of the above.

Moreover, as used herein, the term "area" is not limited to a space of any particular size or shape. An "area" can be fixed in size and/or shape, or can have a size and/or shape that dynamically changes over time.

FIG. 1 discloses an exemplary wireless communication system that may be applicable to embodiments of the present invention. In the example shown in FIG. 1, the wireless communication system is configured to operate in an indoors area 1.

In accordance with embodiments of this invention, a radio map may be generated for an area 1 in which different mobile wireless devices 3, 4a-4b and 8 are operating. In this example, area 1 may be covered by a WLAN (e.g. IEEE802.11a/b/g/n network) communication network with six transceivers (e.g. WLAN access points) 2a-2f fixed installed in different parts of that area 1. In one embodiment, transceivers 2a-2f may be installed outside area 1 related to the radio map. The IEEE802.11a/b/g/n network wireless communication standard disclosed above is exemplary and does not limit the embodiments of the disclosed invention. For example, embodiments of the present invention may comprise wireless devices wherein at least one wireless device operates in accordance with at least one of IEEE802.11x radio signals, cellular radio signals, IEEE802.15.x signals, ultra wideband signals (e.g. IEEE802.15.4a), cellular communication, IEEE802.15.4, etc.

Embodiments of the present invention may also be applicable to a system in which one or more transceivers 2a-2f may be located out of the area 1, given that those transceivers 2a-2f have wireless communication with at least one of the mobile devices 3, 4a-4b and 8 operating in the area 1. In another embodiment, the smartphone 3 has a radio that is able to communicate 16 with the transceivers 2a-2f. The portable computer 8 and the RFID tags 4a-4b can also communicate 9 and 5a-5b with the transceivers 2a-2f. In other embodiments of the present invention, wireless devices (e.g. RFID tags) (not shown) are implemented in area 1, which may only transmit messages (i.e. unidirectional communication). RFID tags of this kind may be used as remote sensors or for tracking purposes as part of a location system. This particular example will be further enhanced in the following sections.

As may be apparent to one skilled in the art, the disclosed wireless mobile devices may comprise many other types of wireless devices which may be not shown in FIG. 1 but are still applicable to embodiments of the present invention. For example, portable computing devices (e.g. PC tablets, netbooks, notebook computers), industrial & medical devices with wireless communication (e.g. barcode readers, infusion pumps, patient monitoring systems, remote sensors, etc.), personal navigation units, media players, etc. may be implemented consistent with the disclosed embodiments.

In certain embodiments, the network transceivers $2a$-$2f$ (e.g. WLAN Access Points) may be connected 7 to a network server 6. In other embodiments, connection 7 may be implemented through an Access Point controller. To improve the clarity of FIG. 1, only the connection 7 with transceiver $2e$ is shown. Connection 7 may include a wired connection (e.g., Ethernet connection) or any other type of communication connection used for data communications, such as a wireless connection, fiber optic, etc.

While only two tags $4a$ and $4b$, one laptop 8, one smartphone 3, one server 6 and six transceivers $2a$-$2f$ are shown, aspects of the present invention may be implemented with a various number of different components. Thus, the number of components illustrated in FIG. 1 is not limiting to the disclosed embodiments.

In the example shown in FIG. 1, the mobile wireless devices 3, $4a$-$4b$ and 8 operating in the area 1, may transmit wireless signals 16, $5a$-$5b$ and 9 that may be received by one or more transceivers $2a$-$2f$. The receiver in those transceivers $2a$-$2f$ may receive those messages and then may measure the signal strength and/or other parameters of the received signals. The signal measurements along with the identification of the transceivers and other optional information related to the mobile device(s) may be transferred to the network server 6 for further processing. Signal measurements can be performed by the transceivers $2a$-$2f$ to part or to all of the received signals (e.g. the signal strength may be measured only to multicast or broadcast signals).

The network server 6 is illustrated as a generic embodiment of the computing devices managing the wireless communication network. In some embodiments, the network server 6 may include several computing devices including network controllers, system and security servers, location servers, etc. In certain embodiments, network server 6 may include one or more processors (e.g., processor(s) 60) (referred to herein also as at least one processor), or one or more computer systems that include known components of computer systems that enable computer functionalities, including, for example, communications, storage of data and software (e.g., stored in one or more computer readable mediums, such as memory 61) that, when executed by one or more processors (e.g., processor(s) 60), perform one or more processes consistent with the disclosed embodiments.

The network server 6 may store information related to the wireless communication network, including map or maps of the area 1, location of the transceivers $2a$-$2f$ in respect to those maps, other optional information related to the area (e.g. type of environment, construction characteristics, activity profiles, etc.) and the network (e.g. wireless channel specifications and operational parameters, density of transceivers, etc.).

Once a certain amount of information associated with the mobile wireless devices in the area 1 is available to network server 6, the process of radio map generation for that area 1 may be initiated. It shall be clarified, that a map generation process may be performed just with signal measurements associated with a single mobile device 3, $4a$-$4b$, 8 and/or associated with a single wireless transceiver $2a$-$2f$.

The quality of the radio map also depend (among other parameters) on the amount of signal measurements received in network server 6, the amount of different locations in the area 1 associated with the mobile devices 3, $4a$-$4b$, 8 which transmitted the wireless signals 16, $5a$-$5b$, 9 and the amount and location of the wireless transceivers $2a$-$2f$ which received and measured those signals 16, $5a$-$5b$, 9.

The quality of the generated radio map may improve when the number of collected signal measurements 16, $5a$-$5b$, 9 increases as well as when the measurements are from as many as possible locations in the area 1 and associated with as many as possible wireless transceivers $2a$-$2f$.

Improving the quality of the generated radio map may mean generating the contents of the radio map to represent more accurately the wireless signals propagation behavior in the area.

The area covered by the generated radio map can dynamically change (grow or diminish) over time and does not necessarily need to be determined at the beginning of the process. For example, if signal measurements are only available for a certain part of the area 1, then the generated radio map will include only those zones. Additional zones will be added to the radio map as soon as new measurements are available from those new zones.

The radio map generation process itself may be performed in at least one processor (e.g., processor(s) 60) which may be in network server 6 controlling the wireless network or a separate processor (not shown in FIG. 1). Moreover, this process may be performed as an offline process, even by a computer external to the wireless network, and at a time not strictly related to the time the signal measurements were performed. In that case, this computer external to the wireless network may also be used to generate radio maps to more than one wireless network.

Generation of a radio map may also be performed based on measurements performed by mobile devices of signal transmitted by the infrastructure devices.

Still referring to FIG. 1, transceivers $2a$-$2f$ may transmit beacon signals $20a$-$20f$ which according to this example may be received by mobile devices 3 and 8. Using beacons (e.g., according to IEEE802.11a/b/g/n standards in a WLAN) for the purpose of radio map generation may be a convenient method since those beacons $20a$-$20f$ may be periodically broadcasted at short intervals. However, also other signals that may be transmitted by the transceivers and may be received by the wireless mobile devices 3 and 8 may be used for the purpose of radio map generation.

The mobile devices may measure the signal strength of the received signals 16 and 9 and may report those measurements to the network server 6 using the same wireless network. The process of radio map generation is then very similar to the process as described when signals are transmitted by mobile wireless devices and received and measured by network devices.

The term "location" or "position" refers to a piece of information defining, or at least partially defining, a geographic region within an area where an animate or inanimate object such as an item, person, animal, or any other physical element or thing is located.

Typically this region within the area may be considerably smaller than the area. Thus, for example, "position" or "location" may include a point defined by coordinates, one or more indicators of latitude and/or longitude and/or altitude, an estimate of coordinates, absolute position, a position relative to an object, person or other location, a distance and direction to a reference point or reference location, the boundaries of a space, or a definition associated with a bounded space (e.g., the name, number, or other indicator of a room, gate, entrance, road intersection, or other location). The information defining the position or location of an object within an area need not be of any particular level of accuracy. It may be an estimate, approximation, or precise location, and the level of accuracy as an indicator of any particular position or location may vary over time.

The term "generate" or "generation" of a radio map refers to the creation of a new radio map or to the modification of an existing radio map. The modification can be done in order to update or refine the data in an existing radio map, to change the size or shape of the area associated with that radio map or to alter any other information related to an existing radio map.

A radio map generation can be performed in one or multiple iterations. In the case of multiple iterations, each iteration may comprise generation of a different or revised radio map.

Figure 2:
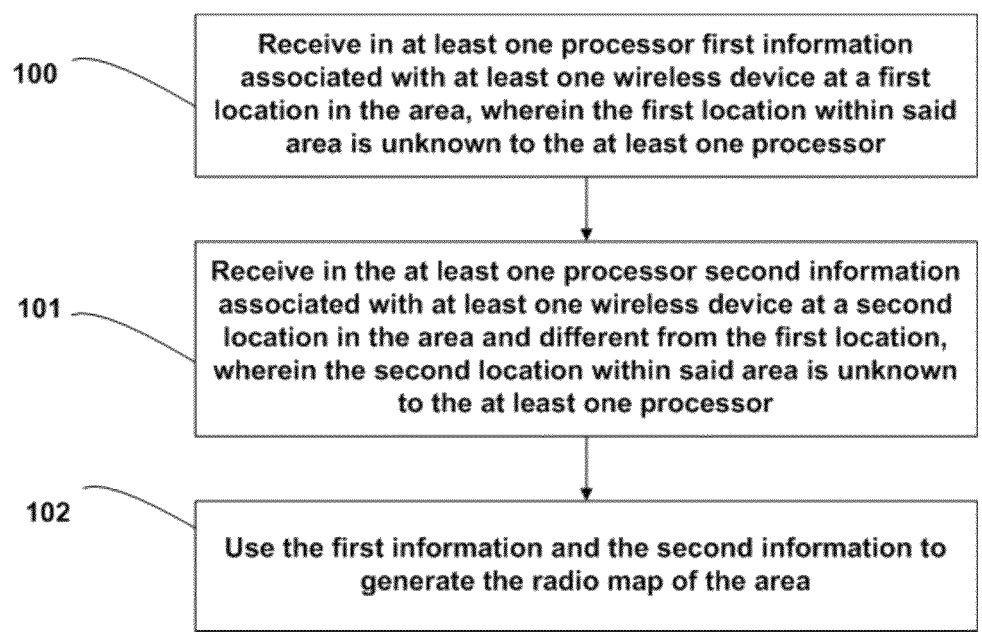
FIG. 2 depicts the process flow of a radio map generation in accordance with an exemplary embodiment of the present invention.

Referring now to FIG. 2, a flow diagram depicting the process used to generate the radio map of an area according to one embodiment of the invention is shown.

According to one embodiment this process may be implemented by a computer-readable medium including instructions for controlling at least one processor to perform a method of generating a radio map of an area. The instructions, when executed by the at least one processor may perform the radio map generation processes.

In one embodiment, the radio map generation method for an area starts when in at least one processor, a first information associated with at least one wireless device at a first location in the area is received. In this exemplary embodiment, the first location within the area is unknown to the at least one processor 100.

The process continues by receiving in the at least one processor second information associated with at least one wireless device at a second location in the area and different from the first location, wherein the second location within said area is unknown to the at least one processor 101.

Then the first information and the second information may be used to generate the radio map of the area 102.

Embodiments of the invention may involve "at least one wireless device". As used herein, the term "at least one wireless device" may refer to any single or plurality of wireless devices associated with a piece of information. Thus, at least one wireless device may include a single or plurality of wireless devices each associated with at least one piece of information from the same or differing locations. Alternatively, the at least one wireless device may include a single wireless device associated to a first piece of information from a first location and a second piece of information from a second location.

For example, when a processor is said to receive information associated with at least one wireless device in a first location and information associated with at least one wireless device in a second location, such a description may refer either to information associated to a single wireless device at two differing locations, or may refer to information associated to two separate wireless devices. Thus, for example, at least one processor may receive first information from a wireless device in a first location, and receive second information from the same wireless device in a second location. In such instance, the single wireless device may be considered "at least one wireless device." Alternatively, for example, at least one processor may receive first information from a first wireless device in a first location, and receive second information from a second wireless device in a second location. In that instance, both wireless devices may be individually and collectively referred to as "at least one wireless device." Thus, the first and second information are both properly referred to as being associated with "at least one processor" even though the first information is associated solely with a first wireless device and the second information is associated solely with a second wireless device.

Moreover, in the case of multiple devices, each device may be of the same type, make, and model, or may be of different types, makes, and models.

Further, first and second information is not limited to any particular volume of quality of data. Large or small quantities of related or unrelated data may constitute "first information" or "second information".

This definition can also expanded to the association of any number of pieces of information and any number of wireless devices and any combination between them.

Embodiments of the invention may include the receipt, generation, or processing of first and second information that lacks position information defining a geographic region in an area. This refers to the fact that the first and second information may exclude all or some degree of "position" or "location" information as defined above. The first and/or second information associated with a specific wireless device may include a description of the wireless device, one or more characteristics of signals associated with that wireless device, and/or any other information which may be associated with that device, except geographical position or location information of the wireless device within the area the wireless device is operating. According to one example, the first and/or second information may include the received signal strength of signals transmitted by a mobile wireless device in an area, the identification of fixed wireless devices receiving the signals transmitted by the mobile wireless device, and no further information defining the geographic position from which those signals are emanating within said area.

In principle this description applies to any information that lacks position information defining a geographic region in an area (e.g. fourth information). Embodiments of the present invention may include systems, methods, apparatuses and/or computer readable mediums where a location of a wireless device within an area is "unknown to a processor". A location of a wireless device is "unknown" to a processor if information received by the processor does not include "position" or "location" information of the wireless device as defined above. For example, a signal strength indication does not include by itself "location information" as defined earlier, and therefore, signal strength indication does not render a wireless device's location "known" to a processor, to the extent that coordinates or other location information of that device is not provided to the processor.

Embodiments of the invention may include a computer-readable medium including instructions for controlling at least one processor to perform a method. The term "computer-readable medium" as used herein refers to any medium that participates in providing instructions to a processor for execution. Such a medium may take many tangible forms, including but not limited to, non-volatile media, volatile media. Non-volatile media includes, for example, optical or magnetic disks. Volatile media includes dynamic memory, such as main memory.

Information may be conveyed using transmission media. Transmission media may include coaxial cables, copper wire and fiber optics, including the wires that comprise bus. Transmission media can also take the form of acoustic or electromagnetic waves, such as those generated during optical, radio wave and infrared data communications.

Other examples of computer-readable media consistent with certain embodiments of the present invention include, one or more of a floppy disk, a flexible disk, hard disk, magnetic tape, or any other magnetic medium, a CD-ROM, DVD, any other optical medium, punch cards, paper tape, any other physical medium with patterns of holes, a RAM, a PROM, and EPROM, a FLASH-EPROM, any other memory chip or cartridge, or any other medium from which a computer or processor may receive information.

In accordance with embodiments of the invention, various forms of computer readable media may be involved in carrying one or more sequences of one or more instructions to a processor for execution. For example, the instructions may initially be carried on a magnetic disk of a remote computer.

A computer-readable medium is said to contain, include instructions for controlling a processor to perform a method if the instructions facilitate the method, regardless of whether all needed instructions are supplied by the computer-readable medium. In addition, in situations where more than one processor is used to perform a method, the computer readable medium is said to contain instructions for controlling if the instructions provide at least some control to at least one processor.

An alternative implementation of the above disclosed embodiments comprises a device for generating a radio map of an area, the device comprising:

at least one processor configured to:

receive first information associated with at least one wireless device at a first location in the area, and wherein the first location is unknown to the at least one processor;

receive second information associated with the at least one wireless device at a second location in the area different from the first location, and wherein the second location is unknown to the at least one processor; and generating a radio map of the area using the first information and the second information.

Embodiments of the invention may include a processor "configured to" perform an action. As used herein, a processor is so configured if it is provided with access to instructions for performing the associated function. A processor may be provided with such instructions either directly through information permanently or temporarily maintained in the processor, or through instructions accessed by or provided to the processor. The processor may include special hardware to execute said related instructions and a communications interface. Alternatively, the processor may be configured to perform a specified function through a connection to a memory location or storage device in which instructions to perform that function are stored.

Figure 3:
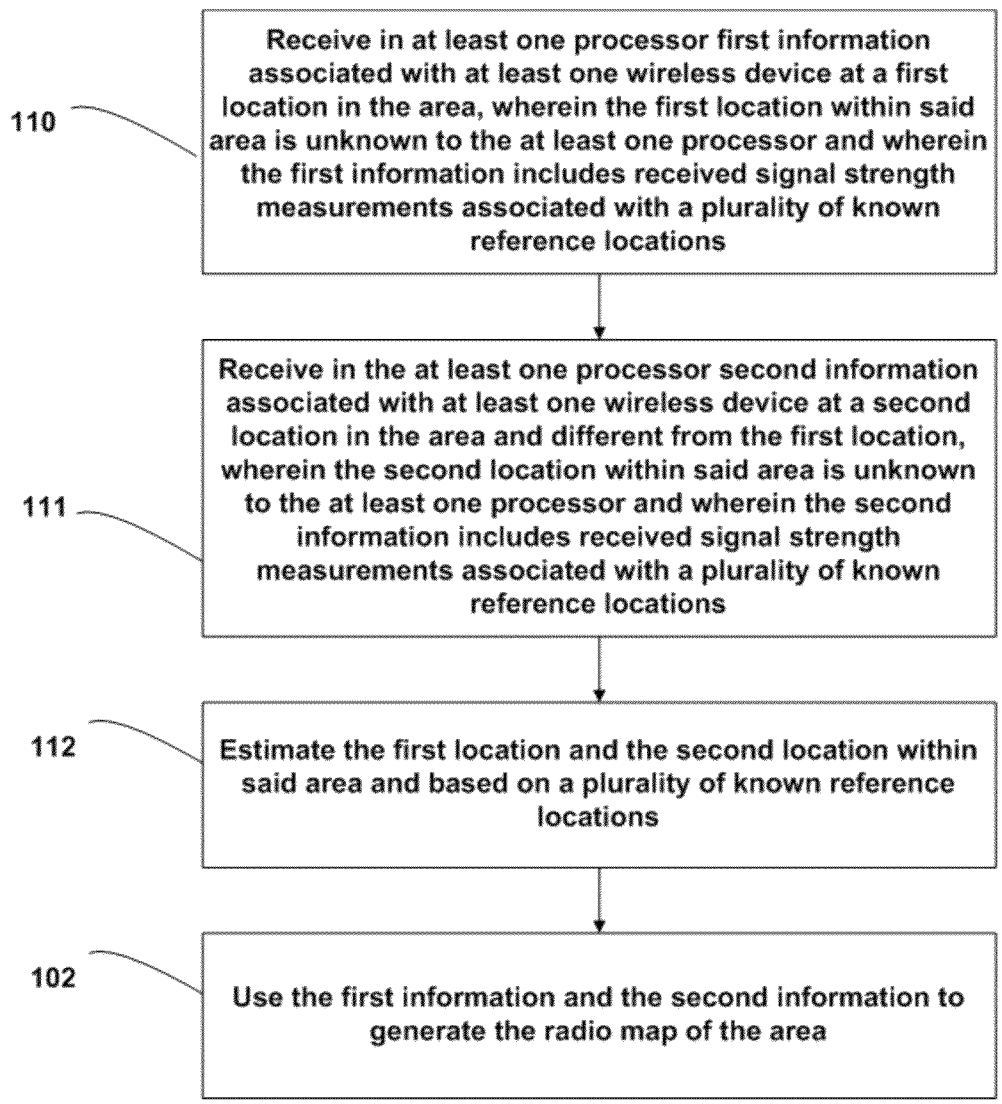
FIG. 3 depicts another exemplary embodiment of a radio map generation process flow comprising known reference locations.

Another embodiment of the present invention as depicted in FIG. 3 comprises estimating the first location and the second location within said area based on the plurality of known reference locations.

Known reference locations or known locations may be associated with an area and may include for example the known location of a transmitter, receiver, transceiver or any other electronic device capable of performing at least some aspect of wireless communication. Included in this definition are access points, base stations, wireless repeaters and routers, wireless nodes and beacon transmitters, or any other transmitter or receiver whose location is capable of serving as a reference point.

A Known reference location or known location of a wireless unit is a location which is known to a processor (e.g. map coordinates) or which may be calculated by the processor independently of the characteristics of the wireless signals, relevant to the radio map generation, which are transmitted and/or received by the wireless unit.

In one embodiment, known reference locations or known locations are also considered locations which may be calculated based on a known unit movement. For example, it is possible to calculate the actual position at a specified time of a unit which is moving along a known path and at a know speed, if the start time is known and the path is defined. Another way may be to provide the start and end points along a path and the start and end times thus allowing calculating the actual location of the unit at any specified time between the start and end times, assuming the speed is constant or by providing additional information regarding the unit movement.

Other examples may include dead reckoning methods, methods using accelerometers, compass devices, or any other method providing the means to calculate the position of a mobile device.

According to the embodiment depicted in FIG. 3, a radio map generation process may start by receiving in at least one processor first information associated with at least one wireless device at a first location in the area, wherein the first location within said area is unknown to the at least one processor and wherein the first information includes received signal strength measurements associated with a plurality of known reference locations 110. The process continues with receiving in the at least one processor second information associated with at least one wireless device at a second location in the area and different from the first location, wherein the second location within said area is unknown to the at least one processor and wherein the second information includes received signal strength measurements associated with a plurality of known reference locations 111.

The process may continue with estimating the first location and the second location within said area and based on a plurality of known reference locations 112.

Estimating the location using received signal strength may create a challenge since if there is no prior radio map for that area, the estimated location may suffer from significant location errors which in turn may affect the radio map generation. Finally, the process may end (or a portion of the process may end) with the generation of the radio map for that area using the first and second information 102.

In another embodiment, the first information and the second information may include received signal strength measurements associated with a plurality of known reference locations.

In accordance with another embodiment, the process mentioned above may be enhanced by receiving in the at least one processor third information associated with at least one wireless device different from the at least one wireless device associated with the first and second information and using the third information to modify at least one estimated location of the at least one wireless device associated with the first and second information.

Using information associated with a known additional location of at least one wireless device in the area is possible in some systems. Thus, in accordance to one embodiment, the radio map generation process further comprises generating the radio map by using the first information, the second information, and additional information associated with a known additional location of at least one wireless device in the area.

As previously explained, the quality of the radio map may improve when more information associated with the wireless devices is available. Having at least fifteen locations associated with one map typically provides enough information to generate a radio map with acceptable quality for certain applications (e.g. rough location of mobile devices or fast coverage planning).

Thus, in accordance to another embodiment, the radio map generation method further comprises receiving in the at least one processor information associated with at least one wireless device from at least fifteen locations within said area, said fifteen locations being unknown to the at least one processor, and wherein said generating of the radio map includes using the information from the fifteen unknown locations. Another embodiment further comprises estimating the fifteen locations prior to generating the radio map.

According to some embodiments the radio map generation may start after receiving in the at least one processor a predetermined amount of information associated with at least one wireless device.

The term "predetermined amount of information" may include, for example, a predetermined number of informational pieces or records which may be used to generate a new radio map or modify an existing radio map.

This predetermined number can be either the same or different for different types of information (e.g. fourth or fifth information) and it may be applied to pieces of information from the same or differing locations.

The predetermined number may be set in accordance with the area size, the number of differing locations and/or the amount of information received from each differing location and any combination between them.

The predetermined number can be any positive integer but for some applications, this number is in the range of at least hundreds to tens of thousands of informational pieces.

For example, the predetermined amount of information may include receiving information from several thousands of locations within said area, said several thousands of locations being unknown to the at least one processor. This will avoid starting this process when only little information is available. For example, when using the radio map in a location system, a practical range is between 1,000 and 50,000 locations with an average of 10,000.

In other embodiments, the decision whether or not a new radio map generation is started, may be more generic and based on one or more of the following parameters:

The number of transmitters and/or receivers in the area.
The amount of information associated with at least one wireless device (e.g. total number of new signal measurements) in the area.
The number of new signal measurements reported from each receiver.
The size of the area.
The number of grid points in the radio map.
The point in time associated with the signal measurements.
The percentage of the area covered by the new signal measurements. This is important to avoid cases in which a radio map o parts of it are updated based on few new measurements. In such a case, the estimated position will be used to calculate the percentage of the area covered.

Using signal strength measurements associated with wireless devices may be useful when generating radio maps of an area. Although the transmission power of the wireless transmitters can be estimated from the signal measurements, it some embodiments, transmission power may also be helpful, if available.

Thus, according to an embodiment of the present invention, the radio map generation method further comprises generating a radio map using a first known transmission power associated with the at least one wireless device at the first location and a second known transmission power associated with the at least one wireless device at the second location.

The radio map, in accordance to the method described in FIGS. 2 and 3, may be generated in a non-iterative process. This means that in one embodiment once the information associated with the wireless devices is available 100-101 in FIGS. 2 and 110-112 in FIG. 3, the last step 102 was executed only once to generate the radio map.

However, the quality of a generated radio map may be improved by estimating the location of the mobile wireless device using a previous generated radio map.

Figure 4:
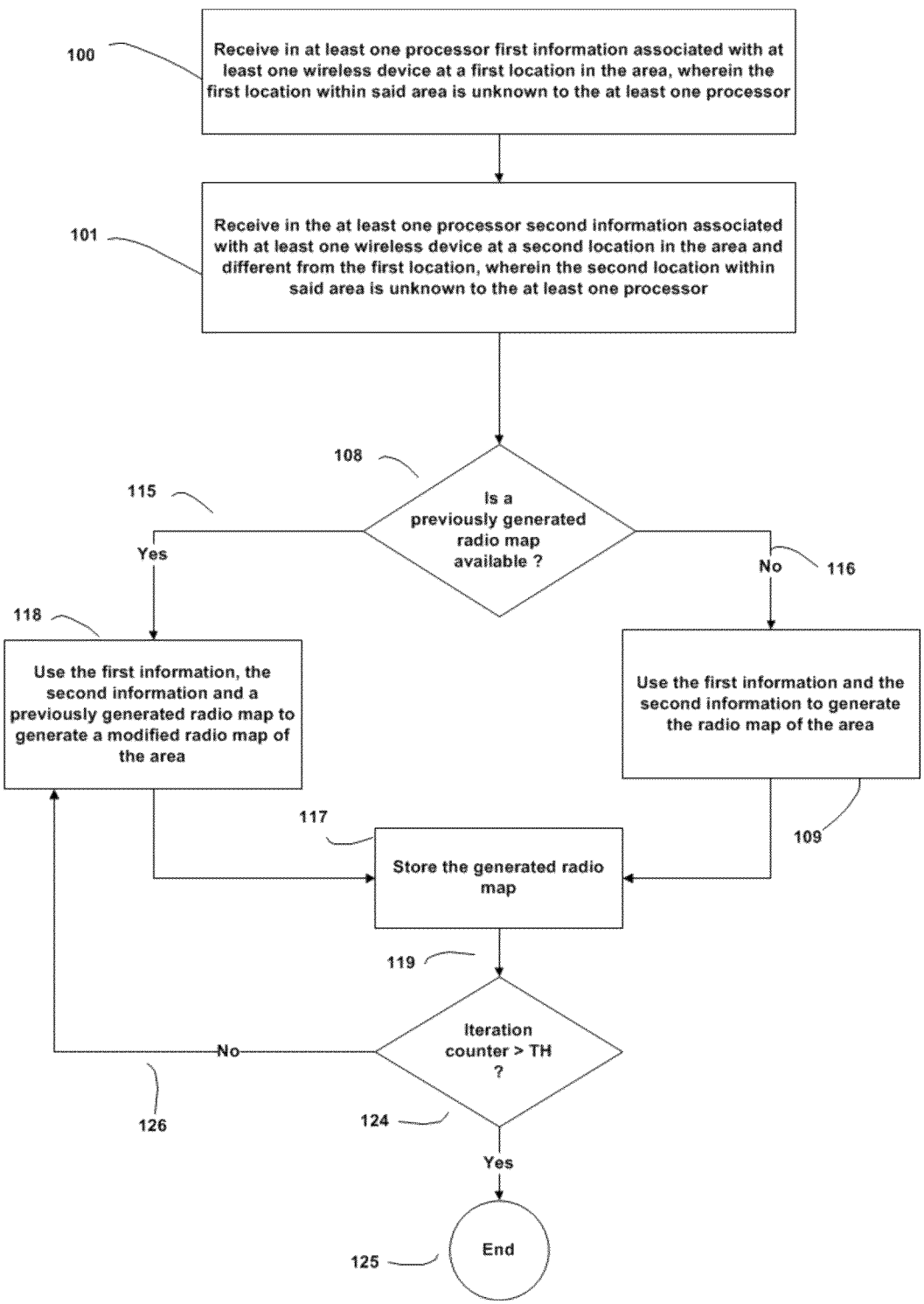
FIG. 4 depicts another exemplary flow of a radio map generation process in which an iterative process may be used to improve the radio map quality in accordance to an embodiment of the present invention.

According to an embodiment of the present invention and referring to FIG. 4 a radio map generation method implementing an iterative process is depicted.

The radio map generation process for an area starts when in at least one processor, a first information associated with at least one wireless device at a first location in the area is received, wherein the first location within said area is unknown to the at least one processor 100.

The process may continue by receiving in the at least one processor second information associated with at least one wireless device at a second location in the area and different from the first location, wherein the second location within said area is unknown to the at least one processor 101.

Then the process may check if there is a previously generated radio map for that area 108.

In the absence of any previously generated radio map for the area 116, the process may continue with the radio map generation using the first and second information 109. Once a radio map has been generated 109, it may be stored 117. That way it may be used in a new iteration of the generation process.

Since the quality of the generated radio map 109 may also depend on the accuracy of the mobile unit location which may be estimated in steps 109 and 118, the radio map quality can be improved by executing again the step of radio map generation 118 estimating the location of the mobile devices using a previously generated radio map.

Therefore, according to this embodiment, the radio map may be generated using an iterative process, in which steps 117-118 are executed a plurality of times, each time using a previously generated radio map.

Since the accuracy of the estimated location is expected to improve in each iteration of the process, the quality of the generated radio map is expected to improve too.

The number of iterations 124 that the above process may comprise may depend on how fast the process converges (i.e., when a new generated radio map is very close to the previously generated radio map). According to one embodiment, the number of iterations 124 can set by a predefined threshold TH (e.g. 3-6 iterations), but in other embodiments, the relevant steps of the process 117-118 can be repeated until the difference between two consecutive generated radio maps is smaller than a certain threshold (e.g. based on the signal strength difference between corresponding zones or points in both radio maps). In this embodiment, the process ends 125 when the iteration counter threshold 124 is exceeded.

A combination of the above thresholds may also be implemented, in order to ensure that the maximum number of iterations will not exceed a predefined number of times (for example in case the CPU resources are limited).

Note that according to the embodiment depicted in FIG. 4, the same first and second information may be used in all the process iterations.

In another embodiment, the radio map generation process can start when a radio map is already available (e.g. generated by a different application). In that case, the process may go directly from step 101 to step 108 and then to 118 without passing first through step 109.

Figure 5:
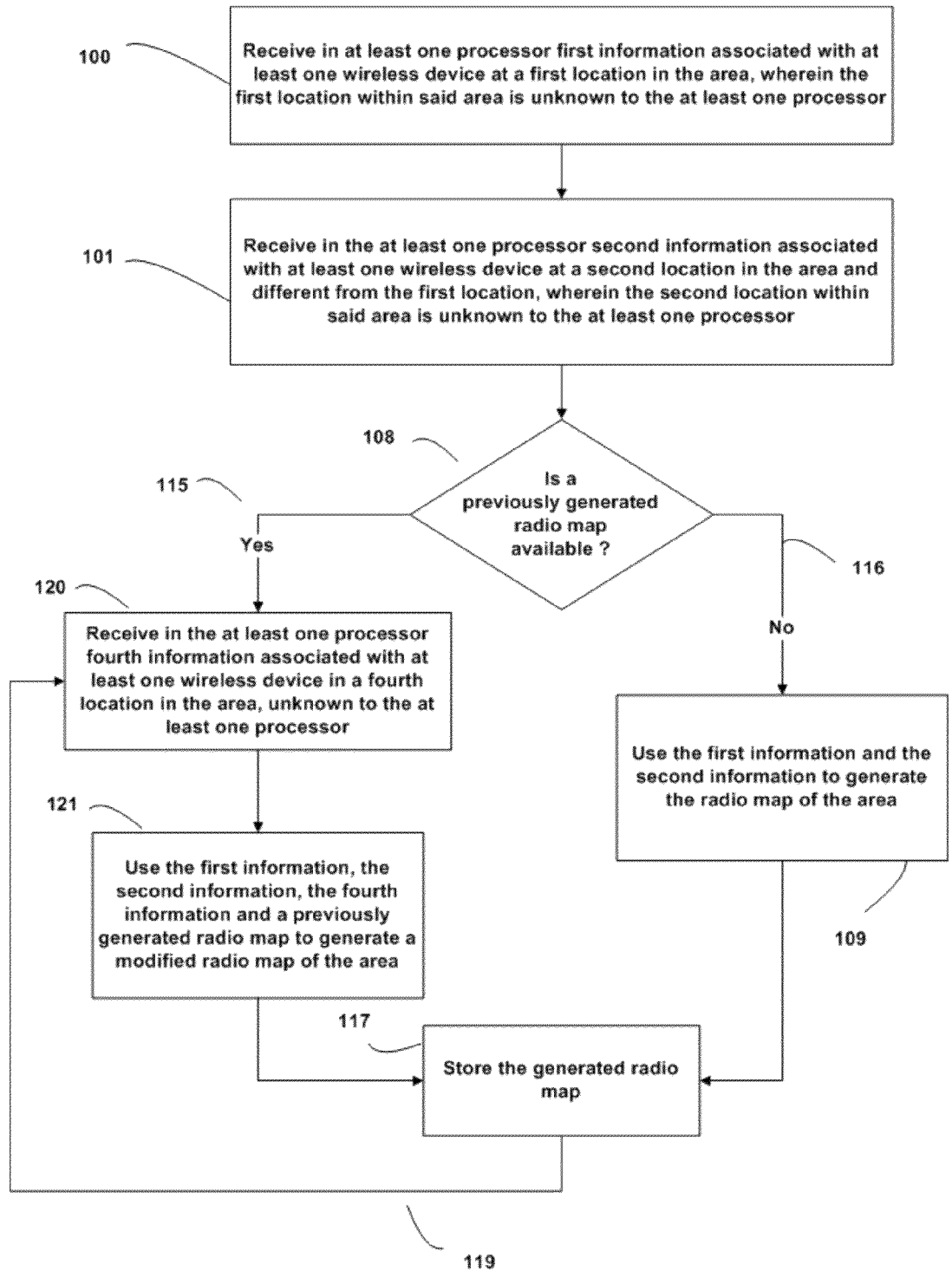
FIG. 5 depicts another exemplary flow of a radio map generation process in which the radio map may be continuously updated in accordance to an embodiment of the present invention.

The process described in FIG. 4 can further be improved in accordance with another embodiment of the present invention as depicted in FIG. 5.

Steps 100-101,108, 116, 109 and 117 are as described in FIG. 4. After a first radio map is generated 109, the additional iterations may further comprise receiving in the at least one processor fourth information associated with at least one wireless device in a fourth location in the area, unknown to the at least one processor 120. Then, the first information, the second information, the fourth information and a previously generated radio map may be used to generate a modified radio map of the area 121. The fourth information may be different information in different iterations thus allowing the process to modify a previously generated radio map using old and new information associated with at least one wireless device.

As can be understood from this description, this embodiment has the ability to continuously generate radio maps using updated information.

The cyclic process depicted in FIG. 5 may be executed according to predetermined periods. Using predetermined periods provides the ability to control how often a new radio map is generated. Thus according to an embodiment of this invention, the radio map generation method further may comprise generating the at least one modified radio map periodically at predetermined intervals.

Embodiments of the invention may involve radio maps which are generated at "predetermined intervals". As used herein, the term "predetermined interval" may refer to a period of time elapsed between two consecutive generations of a radio map related to an area.

The duration of the intervals can be fixed over time or change as a function of other parameters. For example an interval can be one day, which means that a radio map for a certain area may be generated every 24 hours (or approximately every 24 hours).

The predetermined interval may be set in accordance with the area size, the available processing power to generate the radio map, the number of differing locations and the amount of information received from each differing location and any combination between them.

In addition, the predetermined intervals may change as a function of the differences between two consecutively generated radio maps. In this case, the intervals may be shorter when the differences between the radio maps are larger. The intervals may become longer as those differences tend decrease indicating that there is no need to generate a new radio map very often.

The predetermined interval can be any time period which is larger than the radio map generation time (normally not more than few seconds) but using currently available processors, typically it is in the range of hours to several weeks.

Since each new radio map generation may comprise new information from locations which were not available in a previous radio map generation, the area size of the generated radio map may vary between different radio maps. In another embodiment of this invention, the size of the area may change after one or more of said predetermined intervals and said area changes are reflected in said radio map.

Referring now to FIG. 6, an exemplary embodiment of the format of a radio map is depicted. In this exemplary embodiment, the radio map comprises the expected signal strength values by each wireless receiver at grid points (i.e. those are single points which are part of a grid), where each grid point may be in a center of a square zone. The radio map 30 may comprise a table composed of C columns (receivers) and R=n×m rows (Grid points). In this exemplary embodiment, the grid points are represented by X-Y coordinates, where X1,Y1 31 is for example the map origin (e.g. 0,0 point) and Xn, Ym 32 is the last point of the grid of n×m grid points.

Embodiments of the invention may involve radio maps comprising zones which are represented by corresponding single points or grid points inside each of said zones. As used herein, the term "single points" or "grid points" may refer to a geometric location within a zone defined by coordinates, one or more indicators of latitude and/or longitude and/or altitude, absolute position, a position relative to an object, person or other location, a distance and direction to a reference point or reference location, or a definition associated with a bounded space (e.g., the name, number, or other indicator of a room, gate, entrance, road intersection, or other location).

If for example, the grid resolution is 1 m, then the area covered by this radio map 30, will be an area of n meters by m meters.

The radio map 30 may have at least one column for at least one receiver 33 but typically it will include a plurality columns corresponding to a plurality of receivers according to the number of receivers covering the area. FIG. 6 shows a radio map with N receivers and therefore there are N receiver columns (e.g. receiver N 34 appears in the last column).

According to this embodiment, the radio map 30 table is filled with received signal strength values (RSSI), where each single cell in the table denotes the expected signal strength value of a signal received and measured by a receiver of a signal transmitted from a location corresponding to a grid point. For example, cell 35, denotes the expected signal strength from a signal transmitted from the coordinates Xn, Ym and received by receiver ID=3. The RSSI is specified in dBm but in other embodiments different units may be used.

Although in this exemplary embodiment a receiver was mentioned in all the relevant columns, other embodiments may include units which can transmit and receive (i.e. transceivers) or a mix.

Embodiments of the present invention also contemplate cases where a radio map of an area is split into several tables, each one containing a sub-set of the receivers and/or grid points or zones (e.g. several files, where each file comprises a radio map for part of the whole area). The embodiments also contemplate cases in which the total number of grid points or zones is less than n×m due to the shape of the area or other reasons (e.g. masks).

According to this embodiment, the radio map may be stored as a computer file (e.g. text, XML, binary file, etc.) but in other embodiments, it may also be part of a larger database or may be kept in a computer memory as an array of parameters.

As may be apparent to one skilled in the art, a very similar radio map format may also be used to describe the expected signal strength of a signal transmitted by a wireless transceiver (e.g. beacon from an Access Point) and received and measured by a mobile device at a grid point.

A more generic format of the radio map 40 in accordance with another embodiment of this invention is depicted in FIG. 7.

The radio map 40 comprises calculated wireless signals propagation characteristics at each at each zone defined in the radio map 40. In some embodiments, propagation channel parameters may be used to represent in a parametric form, the wireless signals propagation behavior in one or more zones.

Thus, embodiments of the invention may involve radio maps comprising "wireless signal propagation characteristics". As used herein, the term "wireless signal propagation characteristics" may refer to any single or plurality of characteristics associated to the propagation of wireless signals in a certain area, zone or position.

For example, the term "wireless signal propagation characteristics" may comprise any one or a combination of the following:

- The expected signal strength of a signal transmitted from a transmitter located in a specific point or zone and received and measured in a receiver located in a specific point or zone. The expected signal strength may be referenced to a specific transmission power (e.g. of the mobile device) or normalized to a known value (e.g. 0 dBm).
- The variance of the received signal strength.
- The probability to receive at a specific point or zone signals transmitted from a transmitter at a specific point or zone. This form of wireless signal propagation characteristics provides a wider description of the wireless signals propagation at a certain zone or point since it also teaches about the dynamic behavior of those wireless signals.
- The received signal strength attenuation at a specified distance (e.g. 1 m) in a certain area, zone or position.
- The slope of the received signal strength attenuation function as a function of the distance between the transmitter and receiver, in a certain area, zone or position.
- Signal fading and interference in an area, zone or position.
- The roots of a polynomial or any other mathematical representation representing the received signal strength as a function of the distance and/or azimuth from a transmitter. The polynomial or mathematical representation may describe the received signal strength along a line (one dimension), in an area or zone (two or three dimensions).
- Parameters describing construction characteristics in an area or zone which affect wireless signal propagation. For example: building type, construction materials, ceiling height, walls dimensions, doors and windows, metal surfaces, elevators, staircases, etc.
- Parameters describing variations of one or more of the above characteristics as a function of transmitter type, receiver type, transmitter antenna, receiver antenna, transmitter deployment, receiver deployment, transmitted signal power, frequency band, center frequency, data rate, symbol rate, signal modulation and any combination between them.
- Parameters describing variations of one or more of the above characteristics as a function of time, day, season, environmental conditions, population conditions, operational conditions and any combination between them.

The values representing the characteristics can be expected values (e.g. average, maximum, minimum, etc.), measured values, computed values and any combination between them.

Similarly, some embodiments of the invention may involve radio maps comprising "propagation channel parameters". As used herein, the term "propagation channel parameters" may refer to any single or plurality of parameters associated to the behavior of a wireless communication channel in respect to wireless signal propagation in a certain area, zone, position or a plurality of them.

In principle, propagation channel parameters are a subset of the wireless signal propagation characteristics and they describe in a parametric manner the way that wireless signal propagation behaves in a certain area, zone, position or a plurality of them.

For example, the term "propagation channel parameters" may comprise anyone or a combination of the following:

- The received signal strength attenuation at a specified distance (e.g. 1 m) in a certain area, zone or position.
- The slope of the received signal strength attenuation function as a function of the distance between the transmitter and receiver, in a certain area, zone or position.
- Signal fading and interference in an area, zone or position.
- The roots of a polynomial or any other mathematical representation representing the received signal strength as a function of the distance and/or azimuth from a transmitter. The polynomial or mathematical representation may describe the received signal strength along a line (one dimension), in an area or zone (two or three dimensions).
- Parameters describing construction characteristics in an area or zone which affect wireless signal propagation. For example: building type, construction materials, ceiling height, walls dimensions, doors and windows, metal surfaces, elevators, staircases, etc.
- Parameters describing variations of one or more of the above characteristics as a function of transmitter type, receiver type, transmitter antenna, receiver antenna, transmitter deployment, receiver deployment, transmitted signal power, frequency band, center frequency, data rate, symbol rate, signal modulation and any combination between them.
- Parameters describing variations of one or more of the above characteristics as a function of time, day, season, environmental conditions, population conditions, operational conditions and any combination between them.

The term "zone" refers to a geographic region within an area, in which mobile wireless devices may operate. A zone can be indoors or outdoors, on the ground, underground, or above ground, or any combination thereof, and can include for example a room, a group of rooms, a part of a room, a building, a portion of a building (e.g. a floor, a portion of a floor, or group of floors or portions of floors), elevated spaces, a yard, parking lot or garage, warehouse, business, residence, office, mall, plaza, casino, sports facility, food service facility, depot, hospital or other medical facility, storage facility, repair facility, manufacturing facility, transportation hub, distribution hub, a portion of a campus, living facility, city, town, village or neighborhood or any portion thereof; public or private space, mines, tunnels, any space on any suitable vehicle, including ships or other watercraft, wheeled transport vehicles, aircraft or any other vessels; and any and all combinations of the above, portions of the above, or combinations of portions of the above.

In some embodiments of the present invention, an area may include a plurality of zones.

A zone may be of any shape or size and can be described in different ways. For example, when the size and shape of the zones within an area are known, each specific zone can be represented by the coordinates of a single point within this zone. In other cases, zones may be described by the coordinates of a set of points describing a polygon.

Some embodiments of the present invention may include radio maps of areas divided into a plurality of zones, where each of one or more of the zones in the area is characterized by at least one wireless channel propagation characteristic.

A "zone" can be fixed in size and/or shape, or can have a size and/or shape that dynamically changes over time. Zones within an area may have either identical or different size and/or shape. For example an area can be divided into a grid of zones, where each zone is a square of 1×1 meter, or of any other size, depending on design constraints and the designer's preference.

The information defining the zone within an area need not be of any particular format or type.

In this embodiment, zone 41 denotes a pentagon-shape zone which each of its vertex $X_1,Y_1,Z_1$-$X_5,Y_5,Z_5$ is denoted by the coordinates X,Y,Z. Typically, in horizontal areas the zones are also horizontal and at the same height of the whole area and therefore the usage of coordinate Z may be skipped. In other cases, the Z-coordinate may be replaced by the floor number in a building.

Yet according to this embodiment, zone 42 shows an example of another way to represent a zone where $X_6,Y_6,Z_6$ are the coordinates of the center point of a square ($d_6 \times d_6$) zone. The last zone 43 in the radio map 40 describes a triangular zone.

Thus, each row of the radio map 40 comprises the definition of a zone, where each zone 41-43, may be described in different ways. The radio map 40 comprises a table composed of C columns (Receivers) and R=n×m rows (zones).

The radio map 40 has at least one column for at least one receiver 44 but typically it will comprise a plurality columns corresponding to a plurality of receivers in accordance to the number of receivers covering the area. FIG. 7 shows a radio map with N receivers and therefore there are N receiver columns (receiver N 45 appears in the last column).

The radio map 40 table is filled with the calculated values of the wireless signals propagation characteristics, where each single cell in the table comprises the wireless signals propagation characteristics at a specific zone and in respect to a specific receiver. For example cell 46, comprises the wireless signals propagation characteristics at zone $X_{n-2},Y_{m-2},Z_{R-2}$; $X_{n-1},Y_{m-1},Z_{R-1}$; $X_n,Y_m,Z_R$ and related to receiver 3.

In accordance with the receiver deployment and the definition of the zones 41-43, may be cases where the signal propagation characteristics are the same for more than one receiver in respect to a zone. In that case, it may be possible to reduce the radio map size by unifying two or more adjacent cells in a single row.

It may be apparent to one skilled in the art, that the radio map format described in FIG. 7 may include many other variations. For example, the zone definition 41-43 may include an indicator of the building number, floor number, etc.

In other embodiments, the radio map area may include sub-areas (defined by masks) in which there is no need to have a radio map and therefore the zones inside those sub-areas may not be included in the radio map.

In addition, in this exemplary embodiment, a receiver is mentioned by way of example only in all the relevant columns, but it should be clear that other embodiments may include units which can transmit and receive (i.e. transceivers) or may include a mix.

Now referring to the usage of a radio map in a wireless location system, some enhancements to the format described in FIG. 6 and FIG. 7 may be implemented. Those enhancements are in order to improve the location performance and/or functionality of the system.

In radio maps comprising an area composed by a plurality of floors, the zones definitions 31-32, 41-43 may also include an indicator of the floor number. The location algorithms may then estimate the floor in which a mobile device is located based on signal strength measurements of receivers in a plurality of floors as included in the radio map.

Figure 8:
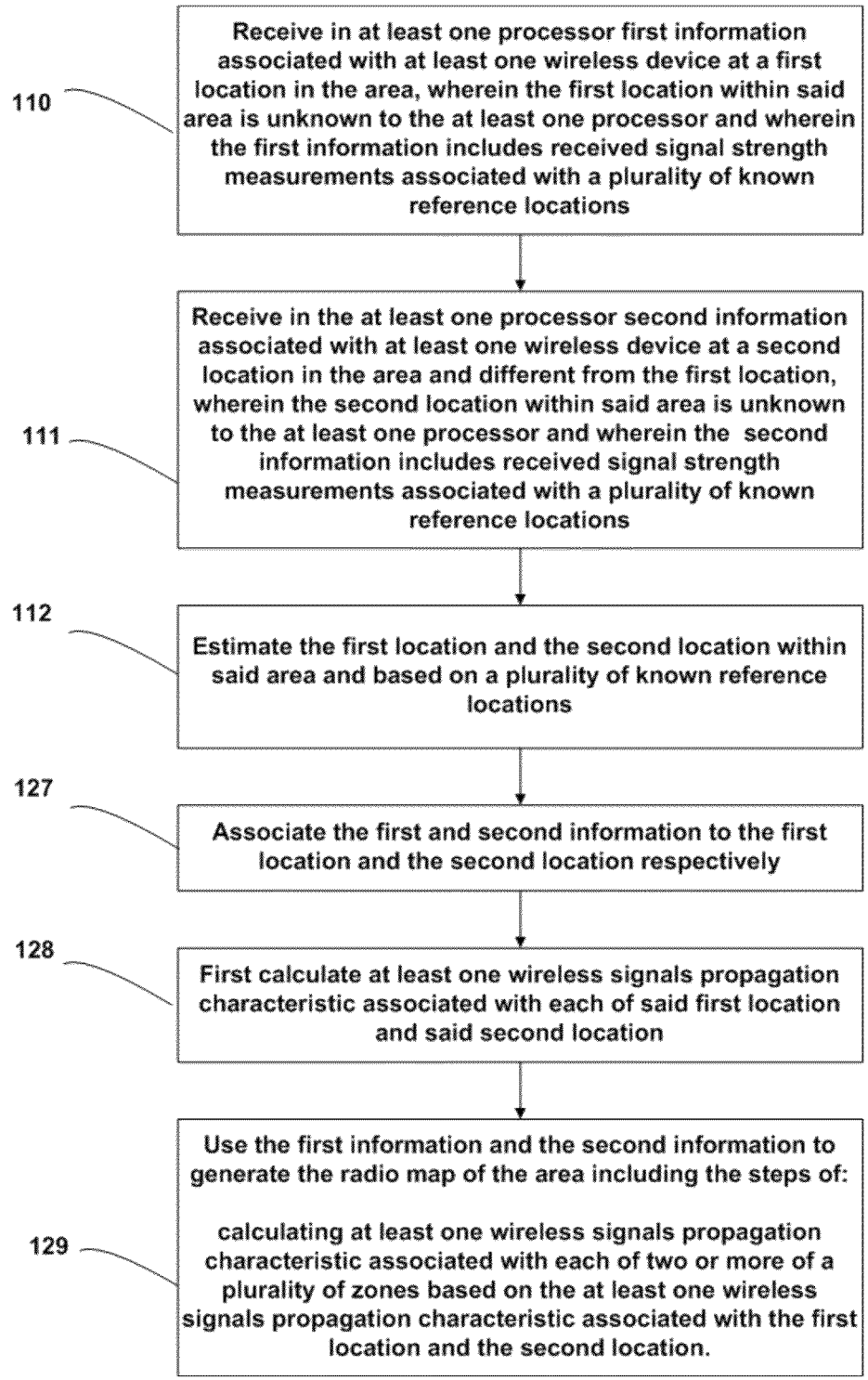
FIG. 8 depicts an exemplary flow of a radio map generation process comprising calculation of signal propagation characteristics in accordance with an embodiment of the present invention.

Now referring to FIG. 8, another exemplary embodiment of the radio map generation method is depicted.

In this exemplary embodiment the area includes a plurality of zones and the generated radio map further comprises at least one wireless signal propagation characteristic associated with each of at least two of said plurality of zones.

The method may comprise the following steps:

Receiving in at least one processor first information associated with at least one wireless device at a first location in the area, wherein the first location within said area is unknown to the at least one processor and wherein the first information includes received signal strength measurements associated with a plurality of known reference locations, such as exemplary locations 110.

Receiving in the at least one processor second information associated with at least one wireless device at a second location in the area and different from the first location, wherein the second location within said area is unknown to the at least one processor and wherein the second information includes received signal strength measurements associated with a plurality of known reference, such as exemplary locations 111.

Estimating the first location and the second location within said area and based on a plurality of known reference locations, such as exemplary known locations 112.

In the absence of any information which characterizes the area 1, the location algorithms may use statistical channel models of the wireless signal propagation while in other cases, when characteristics of the area are known, the location algorithms can make use of that information and then improve the location accuracy.

For example, if the radio map is generated for an indoors area (e.g., office environment or hospital environment), then the signal propagation models used may comprise different parameters than the ones used for an outdoors area. Typical propagation models of wireless signals in different types of environments may be based on empirical measurements.

Embodiments of the present invention may include systems, methods, apparatus and/or computer readable medium wherein the radio map is generated for areas using information characterizing that area.

In some situations, area-characterizing information may be useful in the generation of a radio map.

For example, this characterizing information can indicate a physical characteristic of an area such as environment type including indoors or outdoors, on the ground, underground, or above ground, or any combination thereof; or including for example, an identification for a room, a group of rooms, a building, a portion of a building (e.g. a floor, a portion of a floor, or group of floors or portions of floors), elevated spaces, a yard, parking lot or garage, warehouse, business, residence, office, mall, plaza, casino, sports facility, food service facility, depot, hospital or other medical facility, storage facility, repair facility, manufacturing facility, transportation hub, distribution hub, campus, living facility, city, town, village or neighborhood or any portion thereof; public or private space, mines, tunnels, any space on any suitable vehicle, including ships or other watercraft, wheeled transport vehicles, aircraft or any other vessels; and any and all combinations of the above, portions of the above, or combinations of portions of the above.

The characterizing information may describe constructional characteristics of the area including construction materials, usage of wireless signal absorption or reflection materials, construction maps, the typical size of rooms, corridors, halls or any other space in a building, ceiling and false or dropped ceiling height and type, type of doors and windows, floor type, elevator type, staircase size, metal construction within the area, typical building height in an area, density of trees or other vegetation, and any and all combinations of the above, portions of the above, or combinations of portions of the above.

The characterizing information may also include population characteristics associated with the area including average density of people, its variance, movement characteristics and any and all combinations of the above, portions of the above, or combinations of portions of the above. Those characteristics can be dynamic and change over time. The characterizing information may describe different characteristics at different times and/or the way they change over time.

The characterizing information may also include wireless network characteristics and RF propagation characteristics of the area including the expected variance of the signal strength measurements, the probability to receive signals at a specific point, sources and levels of interference and background noise, wireless network specifications and operational parameters, antennae types, deployment of infrastructure devices, signal fading and multipath characteristics, usage profiles of the network, and any and all combinations of the above, portions of the above, or combinations of portions of the above.

An "estimated location" may include a calculated approximation of an actual location within an area.

Embodiments of the invention may involve "estimating the location" of a mobile wireless device and this may include a mathematical process used to reduce the uncertainty related to the location of that device within an area.

Estimating the location of a wireless device can include one or more methods or technologies either alone or in combination including: Received Signal Strength (RSSI), Time of Arrival (TOA), Time difference of Arrival (TDOA), Round trip time (RTT), Angle of arrival (AOA), Ground positioning system (GPS), aided-GPS, Low frequency exciters, ultrasound and passive infrared.

The location estimation may include software which calculates the location of the wireless devices, for example, using received signal strength measurements, sometimes together with RF signals propagation characteristics such as reflection, attenuation and multi-path.

It should also be clear to one skilled in the art, that a specific mobile device may be located by the system in several locations in the area 1 (e.g. the mobile device moves in the area and transmits signals from several different locations).

The decision whether or not signals are being associated with a single or plurality of locations can be based on additional parameters which may assist in that decision. For example, a motion sensor in the mobile device may indicate if a mobile device transmitted from different locations. In another case, if wireless signals were transmitted by a mobile device at very short intervals, this may indicate that the mobile device could not move too much between said transmissions.

More sophisticated embodiments may comprise mobile devices including accelerometers and/or electronic compasses which can provide data useful to estimate the position of the mobile devices by using tracking algorithms (e.g. using Kalman filters).

The process depicted in FIG. 8 continues with associating the first and second information to the first location and the second location, such as exemplary locations 127. When information from more than one mobile wireless device is involved in the process, the association of that information to one or more mobile device can be achieved by different methods including the time of transmission or reception (e.g. time slot), wireless signal characteristics (e.g. channel, spreading sequence, sequence number, etc.) and of course the mobile device identification (e.g. MAC address, unit ID, etc.), information which is typically available in most of the wireless communication networks.

Note that the information (e.g. signal strength measurements) may be associated with specific locations in the area 1 whether or not this information is associated to one or a plurality of mobile devices.

According to another embodiment of the present invention, several estimated locations may be unified (e.g. using an average filter or any other filter) to a single location. The signal measurements related to those estimated locations will then be associated to that said unified location. This technique allows reducing the number of zones or points which will later be processed in the next step 128 of the radio map generation process and in many cases also provides a quality improvement of the radio map due to the filtering of large location errors.

The process may then first calculate at least one wireless signals propagation characteristic associated with each of said first location and said second location, such as exemplary location 128.

The radio map generation process may be completed by using the first information and the second information to generate the radio map of the area including the steps of:

calculating at least one wireless signals propagation characteristic associated with each of two or more of a plurality of zones based on the at least one wireless signals propagation characteristic associated with the first location and the second location, such as exemplary location 129.

The wireless signals propagation characteristics at a certain zone (e.g., zone 129) may provide the means to estimate the signal strength of a signal transmitted by a mobile device at that zone or point and received by a wireless receiver or vice versa.

In accordance with different embodiments, those wireless signal propagation characteristics may be represented in the radio map using different forms, as already mentioned. In this embodiment the usage of propagation path loss is explained. The number of parameters used to characterize the signal propagation loss at a certain zone or point may differ in different embodiments of the present invention.

A well known model for indoor propagation which is described in many researches, the path loss model has been shown to behave as follows:

$$PL[dB]=PL(d_0)+10n \log(d/d_0)+X\sigma+FAF$$

where:

n: parameter depending on the surroundings and building type $X\sigma$: a normal random variable having a standard deviation of $\sigma$ [dB].

$PL(d_0)$: the path loss in [dB] at reference distance of $d_0=1$ m.

$PL(d_0)$: 40.2 [dB] @ 2450 MHz

FAF: empirical parameter for floor attenuation factor

The propagation path loss model above allows calculating the expected signal loss between a transmitter-receiver pair and therefore the expected signal strength significantly if the transmission power is known.

Still referring to FIG. 8, an embodiment of the present invention may comprise a method of estimating the propagation channel characteristics associated with the estimated locations, such as exemplary locations 128, wherein the at least one wireless signal propagation characteristic associated with each of at least two of said plurality of zones includes one propagation channel parameter.

This particular embodiment may be further enhanced as following described. Assuming that said one propagation channel parameter is $f_{ij}$ and that the mobile wireless devices transmit signals received and measured by infrastructure receivers (it should be clear that the same method may be used when the signals are transmitted by infrastructure devices and received and measured by a wireless mobile device). The method may comprise the following steps:

Calculate the square of the distance d between the receivers and the estimated location calculated of the wireless mobile device: $d^2$ $$d^2 = (x_{rec} - x_{dev})^2 + (y_{rec} - y_{dev})^2 + (z_{rec} - z_{dev})^2$$

Where:

$X_{rec}, Y_{rec}, Z_{rec}$ are the coordinates of the wireless receiver $X_{dev}, Y_{dev}, Z_{dev}$ are the estimated coordinates of the mobile wireless device Calculate said one propagation channel parameter $f_{ij}$ is calculated using the following formula or a substantially similar formula:

$$f_{ij} = \frac{-(r_{ij} + 20 + 10\log_{10} d_{ij}^2)}{(5 + 5\log_{10} d_{ij}^2)}$$

Where:

$f_{ij}$: propagation parameter of signals transmitted at the i-th point by mobile wireless devices and received by the j-th receiver $r_{ij}$: mean RSSI value of signals transmitted at the i-th point by mobile wireless devices and received by the j-th receiver $d_{ij}$: is the distance from the i-th point to the j-th receiver [in meters]

As may be apparent to one skilled in the art, in the equation above, only one propagation channel parameter was calculated. This may be particularly useful in some embodiments of the present invention to the extent that it may significantly simplify an interpolation process which may be required in step 129 of the process over other known methods which require estimating at least two parameters.

The term "substantially similar" as mentioned herein relates to mathematical expression, means any mathematical statement that will provide substantially the same result as the expression described. Thus, in connection with the expression above, substantially similar means, for example, any mathematical expression used to estimate a single propagation channel parameter f of a transmitter-receiver pair, each of these units at differing points, based on the received signal strength r and the distance d between the transmitter and the receiver. Different measurement units can be used to express the distance (meters, feet or any other distance unit).

The exemplary constants specified in this equation were found to provide a close behavior to typical indoors environments and when there is no specific information about the environment in respect to wireless signal propagation. However, other formulas with different constants can also be used to calculate $f_{ij}$ and are part of the embodiments contemplated by the present invention. This is especially applicable when there is some information related to the environment (e.g. outdoors area, dense office area, manufacturing plant, cubicles area, shopping mall, etc.).

It should be apparent to one skilled in the art that the presented model above is just one of the options of channel models and other channel models which generate other channel parameters can also be used and still be in the scope of the disclosed embodiments of the present invention.

In those cases where there is more detailed information about the environment as construction maps, construction materials, ceiling height, hallways characteristics, elevators, staircases, then more sophisticated propagation models which use two-dimensional or tri-dimensional parameters (e.g. distance, azimuth and elevation) may provide closer representation to the actual signal propagation path loss.

In addition, the formula above to calculate $f_{ij}$ assumes the transmission power of the mobile devices is +17 dBm which is a widely used value in WLAN systems. However, when the transmission power is different from this value, the formula above may be modified as follows:

$$f_{ij} = \frac{-(r_{ij} + 37 - TP + 10\log_{10} d_{ij}^2)}{(5 + 5\log_{10} d_{ij}^2)}$$

Where:

TP: Transmission power [in dBm] of the signals transmitted by the mobile wireless devices.

When the transmission power of the mobile devices is unknown, it can be roughly estimated in accordance to the location of the receivers receiving the signals and the measured signal strength.

Once the wireless signal propagation characteristic (in this case in the form of propagation channel parameter f) associated with the each of the estimated locations, such as exemplary locations 128, the process may continue with the calculation of the wireless signals propagation characteristics associated with each of two or more of a plurality of zones, such as exemplary zones 129.

In another embodiment, the radio map generation method may further comprise receiving in the at least one processor information characterizing the area, and wherein said generation includes using the information characterizing the area.

According to another embodiment, the area 1 may be divided into a grid of square zones, and the wireless signals propagation characteristics may be calculated and associated to a single point in the center of that square zone. In other embodiments, the zones may have different sizes and shapes.

The wireless signals propagation characteristics (e.g. the expected signal strength values) in the area may be associated to a grid of points, typically at regular distances. For example, a floor in a hospital can be represented by P points arranged in a grid, where the distance between any two adjacent points is few meters (e.g. 1-5 meters). Increasing the distance between those points may reduce the number of points in that area and the resulting radio map may be able to comprise less details of the wireless coverage in that area. On the other hand, reducing the distance between the points may increase their number and also increase the size of the radio map. Therefore, in some embodiments, it may be important to select the resolution of the grid in a way that will optimize the quality of the generated radio map (i.e. the ability of the radio map to reliably describe the wireless signals propagation characteristics in the area) and the size of the radio map.

In some embodiments of the invention, the grid resolution may be typically in the range of one to a few meters but in very large areas, this resolution may be in the range of 10-30 m and even more. In other embodiments, greater or lesser resolutions may be employed depending on the system requirements.

As may be apparent to one skilled in the art, the process described in FIG. 8 may be applicable and may be optionally included in other embodiments including the ones described in FIGS. 2-5 and FIG. 9.

In another embodiment, after calculating the wireless signals propagation characteristics associated with each of two or more of a plurality of zones, such as exemplary zones 128, and in order to improve the quality of the radio map, a smoothing filter may be applied to smooth the variations of the propagation characteristic(s). A low pass filter is an example of a filter which can be used to achieve that.

Regarding the calculation of the wireless signals propagation characteristics at each of two or more of a plurality of zones of exemplary radio map 129, the step may include combining the new calculated characteristics with the corresponding characteristics calculated in previously generated radio maps (e.g. last N radio maps). This combination may provide smoother changes which are sometimes desirable to avoid large errors. The smoothing process can make use of FIR (finite impulse response) or IIR (infinite impulse response) digital filters for that purpose.

Once the wireless signals propagation characteristics at each zone of the radio map 129 are calculated, the radio map generation may be completed and it can now be stored for further use and/or for the next process iterations.

Signals transmitted by fixed transmitters in addition to those transmitted by mobile wireless devices, can also be used for the radio map generation process.

For example, signal strength measurements of signals transmitted by fixed RFID tags located at known points can also be used to generate the radio map with the benefit of not requiring estimating their location 112. Similar benefit can be achieved by measuring signals transmitted by wireless transceivers (e.g. beacons from Access Points) and received by other wireless receivers. Since the location of the wireless receivers is known, there is no need to calculate their location 112.

The radio map generation process described in FIGS. 2-5 and 8-9 may also comprise one or more of the following functions in respect to other embodiments of the present invention:

Partial radio map update: In new iterations, the radio-map in a certain area may be only partially updated to reflect changes in a portion of that area.

Network infrastructure changes: The radio map generation process includes an algorithm which takes in account misplaced wireless receivers or transmitters (i.e. units which are probably located not in the specified place), added or deleted network devices and this is to avoid errors in the radio map generation.

Periodic behavior: Upon generation of several radio maps during a relatively long period (e.g. days or weeks), the radio map generation algorithm may be able to detect periodic changes in the radio map which can be the result of periodic weather conditions, system activity, etc. Those periodic changes may be used to generate more accurate radio maps.

Temporal periodic changes in the radio map may be used to generate a plurality radio maps, each one applicable to a different time (or time period) of a day or any other time frame. Instead of several radio maps, the radio map may include several records related to a specific zone, each record related to a specific time or time period (time-based records). Interpolation between records can be done to calculate the wireless signals propagation characteristics at times not explicitly included in the radio map.

In a similar way, in cases where different radio maps are used for distinct types of mobile devices, a combined radio map may include different records of wireless signals propagation characteristics, each record applicable to a specific mobile device type and to a specific zone.

Although the radio map generation process may be done based on signal measurements performed during the normal usage of the wireless network, this process may be accelerated by performing an initial calibration or fast learning. For example, this calibration may consist of freely moving along the area (e.g. walking on a floor) with a group of RFID tags transmitting at short intervals (e.g. every few seconds). This way, it may be possible to collect a large amount of signal measurements from many locations in the area and in a short period of time (since there is no need to specify the locations from where the signals are transmitted). In a multiple floor environment, it may be also convenient to specify the floor in which this calibration is performed.

Figure 9:
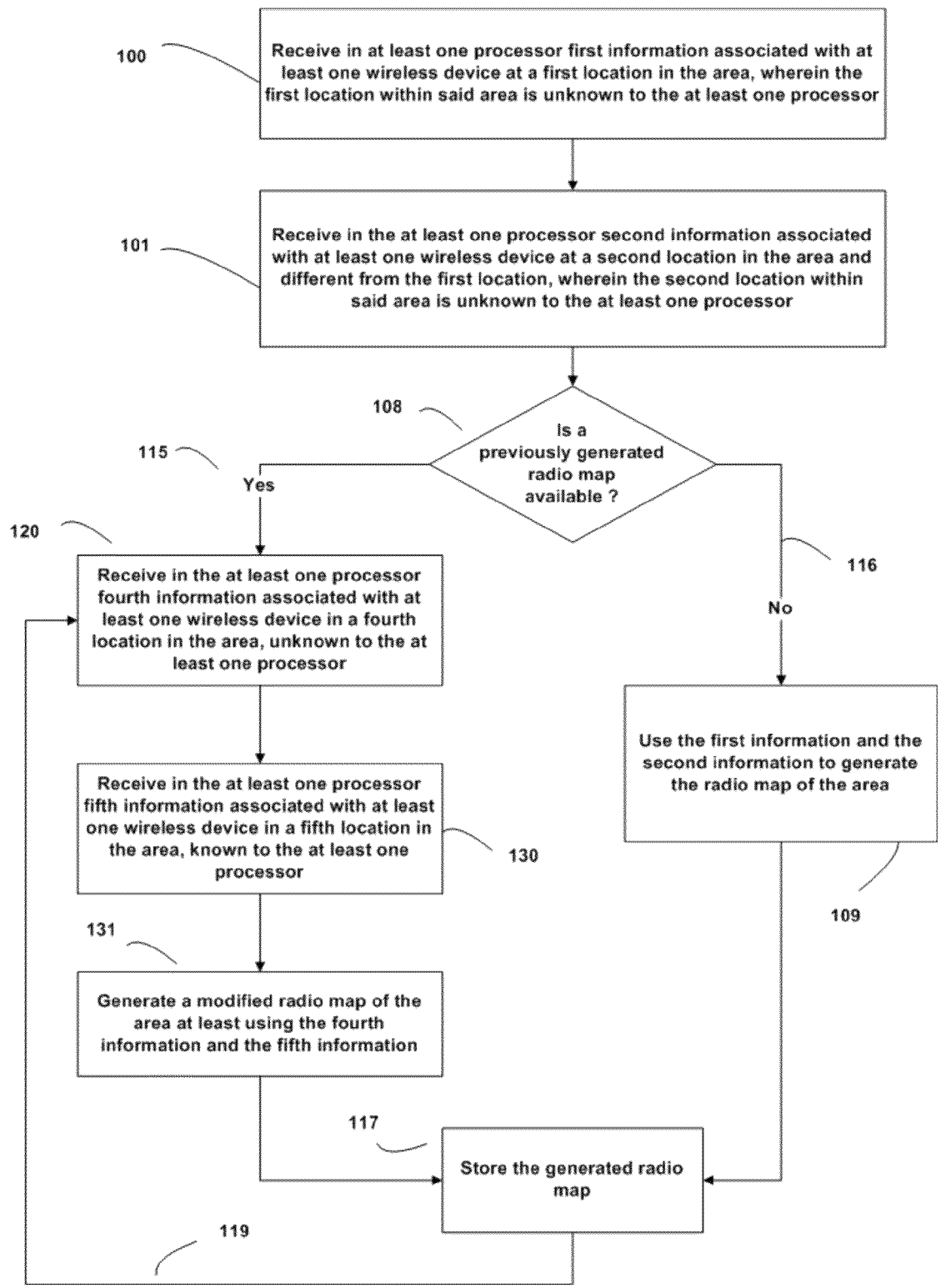
FIG. 9 depicts another exemplary flow of a radio map generation process in which the radio map may be continuously updated based on different types of information in accordance to an embodiment of the present invention.

Referring now to FIG. 9, another exemplary embodiment of the radio map generation method is depicted. Since several steps 100-101, 108-109, 117 and 120 in this radio generation method are identical to the steps described in FIG. 5 the next paragraphs will describe only the different steps 130-131.

In addition to receiving in the at least one processor fourth information associated with at least one wireless device in a fourth location in the area, unknown to the at least one processor, such as exemplary processor 120, the process comprises also receiving in the at least one processor fifth information associated with at least one wireless device in a fifth location in the area, known to the at least one processor, such as exemplary processor 130.

The process may continue with the generation of a modified radio map of the area at least using the fourth information and the fifth information 131. Once a modified radio map has been generated it may be stored 117 for further use.

Since the value for radio map generation of information associated with known locations and with unknown locations may be different, those two types of information may be processed differently by the at least one processor during the radio map generation.

In another embodiment of the present invention, a first weighting factor is associated with the fourth information and a second weighting factor different from the first weighting factor is associated with the fifth information and wherein the at least one modified radio map is generated at least using the first and second weighting factors.

As may be apparent to one skilled in the art, different wireless devices may be associated with the different information. For example, according to one embodiment, said at least one wireless device associated with the first information 100 is a single device that may differ from another single wireless device associated with at least one of the second 200, fourth 120 and fifth information 130.

Similar to some embodiments described in connection with FIG. 3, also in this case the modified radio map generation may start only after receiving in the at least one processor a predetermined amount of information.

According to an embodiment of the invention, the radio map generation method may further comprise initiating said generating of the at least one modified radio map after receiving in the at least one processor a predetermined amount of either said fourth or fifth information, and wherein said predetermined amount depends on at least one of a size of said area, a number of differing locations, and an amount of information received from each of the differing locations.

Embodiments of the invention may include a location system. As used herein, a location system refers to a wireless system able to estimate the location of mobile wireless devices within an area.

The location system may include at least one or more of the following either alone or in combination: a wireless access point, a wireless tag, software, a processor, a mobile wireless device, a wireless base station, a wireless receiver, a wireless transmitter, a low-frequency exciter and an ultrasound or infrared communication device.

Wireless location systems may include at least one or more of the following technologies either alone or in combination to estimate the location of the mobile devices: Received Signal Strength (RSSI), Time of Arrival (TOA), Time difference of Arrival (TDOA), Round trip time (RTT), Angle of arrival (AOA), Ground positioning system (GPS), aided-GPS, Low frequency exciters (e.g. 125-132 kHz, 13.56 MHz, etc.), ultrasound and passive infrared.

The location system may include software which calculates the location of the mobile devices, for example, using received signal strength measurements, sometimes together with RF signals propagation characteristics such as reflection, attenuation and multi-path.

For example, in the embodiment as described in FIG. 2, the computer-readable medium may further comprise a location system in which the computer-readable medium is incorporated.

Figure 10:
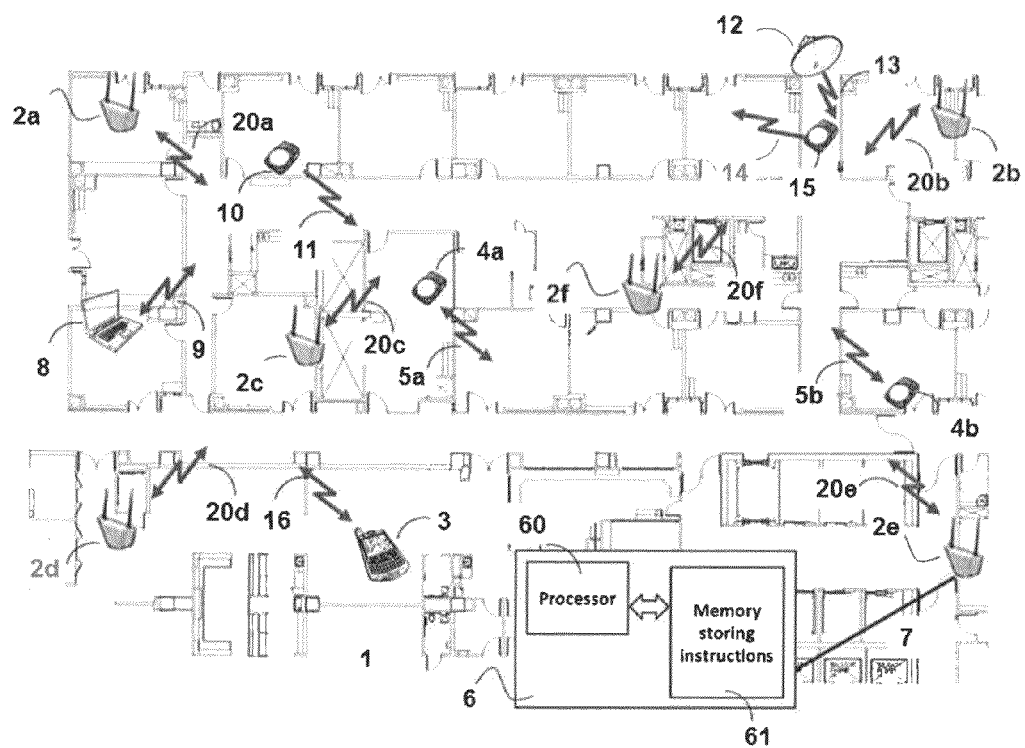
FIG. 10 depicts an exemplary implementation of a WLAN communication and location system in which another embodiment of the present invention may be implemented.

Referring now to FIG. 10, a wireless communication and location system is shown.

Similarly to the wireless communication system described in FIG. 1, the wireless communication and location system according to one embodiment may be associated with an area 1 which may be covered, for example, by a WLAN (e.g. IEEE802.11a/b/g/n network) and which may include communication and location network with, by way of example only, six transceivers (e.g. access points) 2a-2f fixed installed in different parts of that area 1. In addition to wireless communication, the system may be able to locate wireless devices operating in the covered area 1.

Embodiments of the present invention contemplate that it is not required for those exemplary transceivers 2a-2f to be installed inside the area 1 related to the radio map. In some embodiments, one or more transceivers 2a-2f (e.g. WLAN access points) may be located out of the area 1 given that those transceivers 2a-2f have wireless communication with the mobile devices 3, 4a-4b, 8, 10 and 15 operating in the area 1. Still according to this example, the smartphone 3 may have a radio able to communicate 16 with the transceivers 2a-2f. The portable computer 8 and the RFID tags 4a-4b can also communicate 9 and 5a-5b with the transceivers 2a-2f. Some exemplary embodiments of the present invention also contemplate RFID tags which can only transmit messages 10 (i.e. unidirectional) or tags 15 which can receive messages on a low frequency channel 13 (e.g. 125 KHz) and transmit on a UHF channel 14 (e.g. 900 MHz, 2.4 GHz or 5.7 GHz frequency bands). RFID tags of this kind may be used as remote sensors and/or for tracking purposes as part of a location system.

The network transceivers 2a-2f (e.g. WLAN Access Points) may be connected through, for example, connection 7 to a network server 6. To improve the clarity of FIG. 10, only the connection 7 with transceiver 2e is shown. This connection 7 may be either a wired Ethernet connection or another type of interface including wireless connection, fiber optic, etc.

Therefore, according to an exemplary embodiment, the mobile wireless devices 3, 4a-4b, 8, 10, 15 may be operating in the area, may transmit wireless signals 16, 5a-5b and 9 which may be received by one or more transceivers 2a-2f. The receiver in those transceivers 2a-2f may receive those messages and then may measure the signal strength and/or other parameters of the received signals. The signal measurements along with the identification of the transceiver and optionally other information related to the mobile device(s) may be then transferred to the network server 6 for further processing. Signal measurements can be performed by the transceivers 2a-2f to part or to all of the received signals (e.g. the signal strength may be measured only to multicast or broadcast signals).

Referring to this other information and since this embodiment describes a location system, the identification of the mobile devices 3, 4a-4b, 8, 10, 15 being located may be included in the signals 16, 5a-5b, 9, 11 and 14 transmitted by the devices.

The network server 6 may be operational to estimate the mobile devices location 3, 4a-4b, 8, 10 and 15 in the area 1 based on the measured signal strength and/or other location techniques as will be further explained.

As described in a previous embodiment, the network server 6 is illustrated as a generic embodiment of the computing devices managing the wireless communication network. In other embodiments, the network server 6 may comprise one or more computing devices including network controllers, system and security servers, location servers, processors (e.g., processor(s) 60), computer readable mediums (e.g., memory 61), etc.

The network server 6 may keep information related to the wireless communication network, including map or maps of the area 1, location of the transceivers 2a-2f with respect to those maps and optionally other information related to the area (e.g. type of environment, construction characteristics, activity profiles, etc.) and the network (e.g. wireless channel characteristics and parameters, density of transceivers, etc.).

In accordance with one embodiment of the invention, a radio map may be generated for an area 1 in which different mobile wireless devices, such as two or more of exemplary devices 3, 4a-4b, 8, 10 and 15 may be operating.

Once the network server 6 receives the signal measurements associated to the signals 16, 5a-5b, 9, 11, 14, the server 6 may calculate the location of the corresponding mobile device.

The location methods used by the server 6 to locate the mobile devices may include one or a plurality of methods. In the absence of a previously generated radio map, the server 6 may use the signal measurements and statistical channel propagation models to estimate the mobile device location. When a radio map is available, the server 6 may correlate the received signal measurements to that radio map and estimate the mobile device location.

However, other location methods are also possible. Embodiments of the present invention, applicable to the exemplary system as described in FIG. 10, may comprise a tag 15 which is close to a low frequency (LF) exciter 13 may be triggered by an LF transmission of that exciter 13 and as a result of this trigger, the tag 15 may transmit an RF signal 14 including the identification of the tag 15 and the identification of the exciter 13. Since the transmission range of that exciter 13 may be relatively short (up to few meters), the server 6 may estimate the tag 15 location according to the location of the LF exciter 13 which may be known to the server 6. Still in accordance with this exemplary system, smartphone 3 may comprise a GPS receiver and the transmitted signals 16 may include the global position coordinates as calculated by the GPS receiver. Also in this case, the server 6 may estimate the mobile device location also using the reported GPS data.

In addition, the server may use time based techniques as time-of-arrival (TOA) or differential time-of-arrival (TDOA), or angle of arrival (AOA) to locate the mobile device.

Therefore, according to this exemplary system, the location system may operate continuously and the server 6 may calculate the location of the mobile devices 3, 4a-4b, 8, 10 and 15.

Once a certain amount of information associated with the mobile wireless devices in the area 1 is available to the at least one processor, such as exemplary processor 60, the process of radio map generation for that area 1 may be initiated. In certain embodiments, a map generation process may be performed just with signal measurements associated with a single mobile device 3, 4a-4b, 8 and/or associated with a single wireless transceiver 2a-2f.

The radio map generation process itself may be performed in at least one processor which may be in network server 6 controlling the wireless network, such as processor(s) 60, or may be a separate processor (not shown in FIG. 10). Moreover, this process may be performed as an offline process, even by a computer external to the wireless network, and at a time not strictly related to the time the signal measurements were performed.

The process of radio map generation as explained in FIGS. 2-5 and 8-9, may comprise additional aspects as following described.

The association of the signal measurements 102 and the location of the mobile devices 104, 118 may be part of the location process performed by the server 6. As previously explained, the location estimate 104, 118 may also make use of different location techniques in accordance to the capabilities of the location system.

Generating the radio map as part of an online process may allow the server 6, using the generated radio map, to perform the location functions.

This feature may provide a continuous improvement of the radio map which in turn may provide better location accuracy. This may be particularly useful in some embodiments when the environment in which the location is performed gradually changes. Since those environmental changes are typically reflected in changes in the wireless signal coverage, the continuous update of the radio map may provide stable location accuracy even in the presence of wireless coverage changes. This approach may enable dynamic adaptation to environmental changes without requiring extra hardware and/or user intervention.

According to one embodiment, the radio map generation method may further comprise using the generated radio map to determine a location of the at least one wireless device in the area, and using the determined location of the at least one wireless device to further modify the radio map.

As can be apparent to one skilled in the art, using the disclosed embodiments in location systems may facilitate the proliferation of location based services (LBS) in WLAN systems and many other wireless communication systems.

Still referring to FIG. 10, once a radio map has been generated, it may be transferred from the server 6 to units like smartphone 3 or laptop 8 together with map information and network information. Since those devices 3 and 8 may be able to receive signals 16,9 (e.g. beacons) transmitted 20a-20f by network devices 2a-2f and measure their signal strength and/or other parameters, they may also estimate their own location based on the measured signals, radio map and network information. This may be deployed in applications where self-navigation of mobile devices may be required.

In some embodiments, the network may continuously update those devices with any new generated radio map or any new information related to the area 1 and/or network.

Now referring back to the format of the radio map and in particular referring to the usage of a radio map in a wireless location system, some enhancements to the format already described in FIG. 6 and FIG. 7 may be implemented. This may allow improved the location performance and/or functionality of the system.

As previously described, in radio maps comprising an area composed by a plurality of floors, the zones definitions 31-32, 41-43 may comprise the floor number or some other indicator thereof. The location algorithms may include floor separation algorithms able to estimate the floor in which a mobile device is located based on signal measurements of associated with wireless devices in a plurality of floors.

While embodiments of the invention have been particularly shown and described with reference to the described embodiments thereof, it will be understood by those skilled in the art that many alternatives, modifications and variations and other changes in form, and details may be made therein without departing from the spirit and scope of the disclosed embodiments of the invention.

The invention claimed is:

1. A non-transitory computer-readable medium containing instructions that, when executed by at least one processor, cause the at least one processor to perform a method of generating a radio map of an area, the method comprising the steps of:
   receiving in the at least one processor first information associated with at least one wireless device at a first location in the area, wherein the first location within said area is unknown to the at least one processor;
   receiving in the at least one processor second information associated with at least one wireless device at a second location in the area and different from the first location, wherein the second location within said area is unknown to the at least one processor; and
   using the first information and the second information to generate the radio map of the area, wherein generating the radio map comprises:
      calculating at least one wireless signal propagation characteristic associated with each of the first location and the second location; and
      using the calculated at least one wireless signal propagation characteristic to calculate at least one wireless signal propagation characteristic for other locations in the area.

2. The non-transitory computer-readable medium of claim 1, wherein the first information and the second information include received signal strength measurements associated with a plurality of known reference locations.

3. The non-transitory computer readable medium of claim 2, wherein prior to generating, the method further comprises estimating the first location and the second location within said area and based on the plurality of known reference locations.

4. The non-transitory computer readable medium of claim 3, wherein the method further comprises receiving in the at least one processor third information associated with at least one wireless device different from the at least one wireless device associated with the first and second information and using the third information to modify at least one estimated location of the at least one wireless device associated with the first and second information.

5. The non-transitory computer readable medium of claim 1, wherein the first information lacks position information defining a geographic region of the first location within said area and wherein the second information lacks position information defining a geographic region of the second location within said area.

6. The non-transitory computer-readable medium of claim 1, wherein the method further comprises generating the radio map by using the first information, the second information, and additional information associated with a known additional location of at least one wireless device in the area.

7. The non-transitory computer-readable medium of claim 1, wherein the method further comprises receiving in the at least one processor information associated with at least one wireless device from at least fifteen locations within said area, said at least fifteen locations being unknown to the at least one processor, and wherein said generating of the radio map includes using the information from the at least fifteen unknown locations.

8. The non-transitory computer-readable medium of claim 7, wherein prior to generating, the method further comprises estimating the at least fifteen locations.

9. The non-transitory computer-readable medium of claim 1, wherein the method further comprises generating a radio map using a first known transmission power associated with the at least one wireless device at the first location and a second known transmission power associated with the at least one wireless device at the second location.

10. The non-transitory computer-readable medium of claim 1, wherein the method further comprises iteratively generating at least one modified radio map using a previously generated radio map.

11. The non-transitory computer-readable medium of claim 10, wherein the method further comprises receiving in the at least one processor fourth information associated with at least one wireless device in a fourth location unknown to the at least one processor and generating the at least one modified radio map further using the fourth information.

12. The non-transitory computer-readable medium of claim 1, further comprising a location system in which the computer-readable medium is incorporated.

13. The non-transitory computer-readable medium of claim 1, wherein the method further comprises using the generated radio map to determine a location of the at least one wireless device in the area, and using the determined location of the at least one wireless device to further modify the radio map.

14. The non-transitory computer-readable medium of claim 1, wherein the method further comprises receiving in the at least one processor information characterizing the area, and wherein said generating includes using the information characterizing the area.

15. The non-transitory computer-readable medium of claim 3, wherein said area further includes a plurality of zones within said area.

16. The non-transitory computer-readable medium of claim 15, wherein in said radio map, said zones are further represented by corresponding single points inside each of said zones.

17. The non-transitory computer-readable medium of claim 15, wherein in said radio map, said zones are further represented by corresponding polygons representing each of said zones.

18. The non-transitory computer-readable medium of claim 15, wherein said radio map further comprises the at least one wireless signal propagation characteristic associated with each of at least two of said plurality of zones and wherein said method further comprises the steps of:
associating the first and second information with the first location and the second location respectively;
calculating the at least one wireless signal propagation characteristic associated with each of said first location and said second location; and
computing contents of the radio map of said area, wherein computing includes calculating at least one wireless signal propagation characteristic associated with each of two or more of said plurality of zones based on the at least one wireless signals propagation characteristic associated with the first location and the second location.

19. The non-transitory computer-readable medium of claim 18, wherein the at least one wireless signal propagation characteristic associated with each of at least two of said plurality of zones includes expected signal strength.

20. The non-transitory computer-readable medium of claim 18, wherein the at least one wireless signal propagation characteristic associated with each of at least two of said plurality of zones includes one propagation channel parameter.

21. The non-transitory computer-readable medium of claim 20, wherein said one propagation channel parameter is $f_{ij}$, wherein $f_{ij}$ is calculated using the following formula or a substantially similar formula:

$$f_{ij} = \frac{-(r_{ij} + 20 + 10\log_{10} d_{ij}^2)}{(5 + 5\log_{10} d_{ij}^2)}$$

wherein $f_{ij}$ is the propagation channel parameter of signals transmitted at an i-th point by said at least one wireless device and received by a j-th receiver;
wherein $r_{ij}$ is the mean received signal strength value of signals transmitted at the i-th point by said at least one wireless device and received by a j-th receiver and
wherein $d_{ij}$ is a distance from the i-th point to the j-th receiver in meters.

22. The non-transitory computer-readable medium of claim 1, wherein the at least one wireless device operates in accordance with at least one of IEEE802.11x radio signals, cellular radio signals, IEEE802.15.x signals and ultra wideband signals.

23. The non-transitory computer-readable medium of claim 1, wherein the at least one wireless device is at least one of a smartphone, laptop computer, RFID tag, notebook computer and wireless sensor.

24. The non-transitory computer-readable medium of claim 11, wherein the method further comprises generating the at least one modified radio map periodically at predetermined intervals.

25. The non-transitory computer-readable medium of claim 24, wherein a size of said area may change after one or more of said predetermined intervals and said area changes are reflected in said radio map.

26. The non-transitory computer-readable medium of claim 11, wherein the method further comprises receiving in the at least one processor fifth information associated with said at least one wireless device in a fifth location known to the at least one processor and generating the at least one modified radio map at least using a previously generated radio map and the fourth and fifth information.

27. The non-transitory computer-readable medium of claim 26, wherein a first weighting factor is associated with the fourth information and wherein a second weighting factor different from the first weighting factor is associated with the fifth information and wherein the at least one modified radio map is generated at least using the first and second weighting factors.

28. The non-transitory computer-readable medium of claim 26, wherein said at least one wireless device associated with the first information is a single device that differs from another single wireless device associated with at least one of the second, fourth and fifth information.

29. The non-transitory computer-readable medium of claim 28, wherein the method further comprises initiating said generating the at least one modified radio map after receiving in the at least one processor a predetermined amount of either said fourth or fifth information, and wherein said predetermined amount depends on at least one of a size of said area, a number of differing locations, and an amount of information received from each of the differing locations.

30. A device for generating a radio map of an area, the device comprising:
at least one memory storing instructions; and
at least one processor configured to execute the instructions to:
receive first information associated with at least one wireless device at a first location in the area, and wherein the first location is unknown to the at least one processor;
receive second information associated with the at least one wireless device at a second location in the area different from the first location, and wherein the second location is unknown to the at least one processor; and
generate a radio map of the area using the first information and the second information, wherein the instructions to generate the radio map include instructions to:
calculate at least one wireless signal propagation characteristic associated with each of the first location and the second location; and
determine from the at least one calculated wireless signal propagation characteristic at least one wireless signal propagation characteristic for other locations in the area.

31. The device of claim 30, wherein the first information and the second information include received signal strength measurements associated with a plurality of known reference locations.

32. The device of claim 31, wherein prior to generating, the at least one processor is further configured to execute the instruction to estimate the first location and the second location within said area and based on the plurality of known reference locations.

33. The device of claim 32, wherein the at least one processor is further configured to execute the instructions to receive third information associated with at least one wireless device different from the at least one wireless device associated with the first and second information and to use the third information to modify at least one estimated location of the at least one wireless device associated with the first and second information.

34. The device of claim 30, wherein the first information lacks position information defining a geographic region of the first location within said area, and wherein the second information lacks position information defining a geographic region of the second location within said area.

35. The device of claim 30, wherein the at least one processor is further configured to execute the instructions to generate the radio map by using the first information, the second information, and additional information associated with a known additional location of at least one wireless device in the area.

36. The device of claim 30, wherein the at least one processor is further configured to execute the instructions to receive information associated with at least one wireless device from at least fifteen locations within said area, said fifteen locations being unknown to the at least one processor, and wherein said generating of the radio map includes using the information from the fifteen unknown locations.

37. The device of claim 36, wherein prior to generating, the at least one processor is further configured to execute the instructions to estimate the fifteen locations.

38. The device of claim 30, wherein the at least one processor is further configured to execute the instructions to iteratively generate at least one modified radio map using a previously generated radio map.

39. The device of claim 38, wherein the at least one processor is further configured to execute the instructions to receive fourth information associated with at least one wireless device in a fourth location unknown to the at least one processor and to generate the at least one modified radio map further using the fourth information.

40. The device of claim 30. further comprising a location system in which the at least one processor is incorporated.

41. The device of claim 30, wherein the at least one processor is further configured to execute the instructions to use the generated radio map to determine a location of the at least one wireless device in the area, and to use the determined location of the at least one wireless device to further modify the radio map.

42. The device of claim 32, wherein said area further includes a plurality of zones within said area.

43. The device of claim 42, wherein in said radio map, said zones are further represented by corresponding single points inside each of said zones.

44. The device of claim 42, wherein said radio map further comprises at least one wireless signal propagation characteristic associated with each of at least two of said plurality of zones and wherein the at least one processor is further configured to execute the instructions to:
associate the first and second information with the first location and the second location respectively;
calculate the at least one wireless signal propagation characteristic associated with each of said first location and said second location; and
compute the contents of the radio map of said area including the steps of:
calculating at least one wireless signal propagation characteristic associated with each of two or more of said plurality of zones based on the at least one wireless signal propagation characteristic associated with the first location and the second location.

45. The device of claim 44, wherein the at least one wireless signal propagation characteristic associated with each of at least two of said plurality of zones includes expected signal strength.

46. The device of claim 44, wherein the at least one wireless signal propagation characteristic associated with each of at least two of said plurality of zones includes one propagation channel parameter.

47. The device of claim 39, wherein the at least one processor is further configured to execute the instructions to generate the at least one modified radio map periodically at predetermined intervals.

48. The device of claim 39, wherein the at least one processor is further configured to execute the instructions to receive fifth information associated with said at least one wireless device in a fifth location known to the at least one processor and to generate the at least one modified radio map at least using a previously generated radio map and the fourth and fifth information.

49. The device of claim 48, wherein said at least one wireless device associated with the first information is a single device that differs from another single wireless device associated with at least one of the second, fourth, and fifth information.

50. The device of claim 49, wherein the at least one processor is further configured to execute the instructions to initiate said generate the at least one modified radio map after a predetermined amount of either said third or fourth information is received, and wherein said predetermined amount depends on at least one of a size of said area, a number of differing locations, and an amount of information received from each of the differing locations.

51. A method of generating a radio map of an area, the method comprising:
    receiving in at least one processor first information associated with at least one wireless device at a first location in the area, and wherein the first location is unknown to the at least one processor;
    receiving in said least one processor second information associated with at least one wireless device at a second location in the area different from the first location, and wherein the second location is unknown to the at least one processor; and
    generating a radio map of the area using the first information and the second information, wherein generating the radio map comprises:
        calculating at least one wireless signal propagation characteristic associated with each of the first location and the second location; and
        using the at least one calculated wireless signal propagation characteristic to calculate at least one wireless signal propagation characteristic for other locations in the area.

52. The method of claim 51, wherein the first information and the second information include received signal strength measurements associated with a plurality of known reference locations.

53. The method of claim 52, wherein prior to generating, the method further comprises estimating the first location and the second location within said area and based on the plurality of known reference locations.

54. The method of claim 53, further comprising receiving in the at least one processor third information associated with at least one wireless device different from the at least one wireless device associated with the first and second information, and using the third information to modify at least one estimated location of the at least one wireless device associated with the first and second information.

55. The method of claim 51, wherein the first information lacks position information defining a geographic region of the first location within said area, and wherein the second information lacks position information defining a geographic region of the second location within said area.

56. The method of claim 51, wherein the method further comprises generating the radio map by using the first information, the second information, and additional information associated with a known additional location of at least one wireless device in the area.

57. The method of claim 51, wherein the method further comprises receiving in the at least one processor information associated with at least one wireless device from at least fifteen locations within said area, said fifteen locations being unknown to the at least one processor, and wherein said generating of the radio map includes using the information from the fifteen unknown locations.

58. The method of claim 57, wherein prior to generating, the method further comprises estimating the fifteen locations.

59. The method of claim 51, wherein the method further comprises generating a radio map using a first known transmission power associated with the at least one wireless device at the first location and a second known transmission power associated with the at least one wireless device at the second location.

60. The method of claim 51, wherein the method further comprises iteratively generating at least one modified radio map using a previously generated radio map.

61. The method of claim 60, wherein the method further comprises receiving in the at least one processor fourth information associated with at least one wireless device in a fourth location unknown to the at least one processor and generating the at least one modified radio map further using the fourth information.

62. The method of claim 51, further comprising a location system in which the method is incorporated.

63. The method of claim 51, wherein the method further comprises using the generated radio map to determine a location of the at least one wireless device in the area, and using the determined location of the at least one wireless device to further modify the radio map.

64. The method of claim 53, wherein said area further includes a plurality of zones within said area.

65. The method of claim 64, wherein in said radio map, said zones are further represented by corresponding single points inside each of said zones.

66. The method of claim 64, wherein said radio map further comprises at least one wireless signal propagation characteristic associated with each of at least two of said plurality of zones and wherein said method further comprising the steps of:
    associating the first and second information with the first location and the second location respectively;
    calculating the at least one wireless signal propagation characteristic associated with each of said first location and said second location; and
    computing the contents of the radio map of said area, wherein computing includes:
        calculating at least one wireless signal propagation characteristic associated with each of two or more of said plurality of zones based on the at least one wireless signals propagation characteristic associated with the first location and the second location.

67. The method of claim 66, wherein the at least one wireless signal propagation characteristic associated with each of at least two of said plurality of zones includes expected signal strength.

68. The method of claim 66, wherein the at least one wireless signal propagation characteristic associated with each of at least two of said plurality of zones includes one propagation channel parameter.

69. The method of claim 68, wherein said one propagation channel parameter is $f_{ij}$, wherein $f_{ij}$ is calculated using the following formula or a substantially similar formula:

$$f_{ij} = \frac{-(r_{ij} + 20 + 10\log_{10} d_{ij}^2)}{(5 + 5\log_{10} d_{ij}^2)}$$

wherein $f_{ij}$ is the propagation channel parameter of signals transmitted at an i-th point by said at least one wireless device and received by a j-th receiver;
wherein $r_{ij}$ is the mean received signal strength value of signals transmitted at the i-th point by said at least one wireless device and received by a j-th receiver and
wherein $d_{ij}$ is a distance from the i-th point to the j-th receiver in meters.

70. The method of claim 51, wherein the at least one wireless device operates in accordance with at least one of IEEE802.11x radio signals, cellular radio signals, IEEE802.15.x signals and ultra wideband signals.

71. The method of claim 61, wherein the method further comprises generating the at least one modified radio map periodically at predetermined intervals.

72. The method of claim 61, wherein the method further comprises receiving in the at least one processor fifth information associated with said at least one wireless device in a fifth location known to the at least one processor and generating the at least one modified radio map at least using a previously generated radio map and the fourth and fifth information.

73. The method of claim 72, wherein a first weighting factor is associated with the fourth information and wherein a second weighting factor different from the first weighting factor is associated with the fifth information and wherein the at least one modified radio map is generated at least using the first and second weighting factors.

74. The method of claim 72, wherein said at least one wireless device associated with the first information is a single device that differs from another single wireless device associated with at least one of the second, fourth and fifth information.

75. The method of claim 74, wherein the method further comprises initiating said generating the at least one modified radio map after receiving in the at least one processor a predetermined amount of either said fourth or fifth information, and wherein said predetermined amount depends on at least one of a size of said area, a number of differing locations, and an amount of information received from each of the differing locations.

* * * * *